(12) United States Patent
Koike et al.

(10) Patent No.: US 7,711,147 B2
(45) Date of Patent: May 4, 2010

(54) TIME-TO-CONTACT ESTIMATION DEVICE AND METHOD FOR ESTIMATING TIME TO CONTACT

(75) Inventors: Hiroyuki Koike, Utsunomiya (JP); Shingo Ogawa, Utsunomiya (JP); Ichiro Masaki, Boxborough, MA (US); Berthold K. P. Horn, Interrale, NH (US); Yajun Fang, Cambridge, MA (US)

(73) Assignees: Honda Motor Co., Ltd. (JP); Massachusetts Institute of Technology, Cambridge, MA (US)

( * ) Notice: Subject to any disclaimer, the term of this patent is extended or adjusted under 35 U.S.C. 154(b) by 832 days.

(21) Appl. No.: 11/495,944

(22) Filed: Jul. 28, 2006

(65) Prior Publication Data

US 2008/0046181 A1 Feb. 21, 2008

(51) Int. Cl.
*G06K 9/00* (2006.01)
(52) U.S. Cl. .................. 382/103; 701/301; 382/107
(58) Field of Classification Search ............... 703/301; 382/103–107; 367/909; 340/3.41; 342/28, 342/41, 65, 455, 454; 345/473, 958; 700/255
See application file for complete search history.

(56) References Cited

U.S. PATENT DOCUMENTS

| | | | |
|---|---|---|---|
| 5,559,695 A * | 9/1996 | Daily | 701/1 |
| 5,793,357 A | 8/1998 | Ivey et al. | |
| 6,084,574 A | 7/2000 | Bidiville | |
| 6,124,587 A | 9/2000 | Bidiville et al. | |

OTHER PUBLICATIONS

Berthold K.P. Horn, Determining Constant Optical Flow, 2003, downloaded on May 4, 2009 from http://people.csail.mit.edu/bkph/articles/Fixed_Flow.pdf.*
V. Sundareswaran, P. Bouthemy and F. Chaumette, Computer Vision—ECCV '94: Active Camera Self-orientation using Dynamic Image Parameters, 1994, Springer Berlin / Heidelberg, vol. 801, pp. 110-116.*
Horn et al., "Determining Optical Flow." Artifical Intelligence 17:185-203 (1981).
Lucas et al., "An Iterative Image Registration Technique with an Application to Stereo Vision." Proceedings DARPA Image Understanding Workshop pp. 121-130 (1981).
Bruss et al., "Passive Navigation." Computer Vision, Graphics and Image Processing 21:3-20 (1983).
Tanner et al., "A Correlating Optical Motion Detector." Conference on Advanced Research in VSLI, M.I.T. Jan. 23, 1984.

(Continued)

*Primary Examiner*—Chanh Nguyen
*Assistant Examiner*—Adakou Foli
(74) *Attorney, Agent, or Firm*—Fish & Richardson P.C.

(57) ABSTRACT

A time-to-contact estimation device for estimating a time to contact of a moving body to an object in surroundings of the moving body, includes: an image sensor provided on the moving body, and continuously capturing time-varying images of the surroundings of the moving body; a brightness change calculation unit calculating brightness changes in pixels between the time-varying images captured one after another; and a time-to-contact calculation unit calculating optimized brightness gradients based on the brightness changes calculated by the brightness change calculation unit, and calculating the time to contact of the moving body to the object based on the optimized brightness gradients.

8 Claims, 15 Drawing Sheets

OTHER PUBLICATIONS

Tanner, J. "Integrated Optical Motion Detection." California Institute of Technology, pp. 1-128 (1986).

Tanner et al., "An Integrated Analog Optical Motion Sensor." California Institute of Technology (1986).

Negahdaripour et al., "Direct Passive Navigation." IEEE Transactions on Pattern Analysis and Machine Integlligence. 9(1):168-176 (1987).

Horn, B. "Motion Fields Are Hardly Ever Ambiguous." International J. of Computer Vision 1:259-274 (1987).

Horn et al., "Direct Methods for Recovering Motion." International J. of Computer Vision 2:51-76 (1988).

Little et al., "Parallel Optical Flow Using Local Voting." IEEE pp. 454-459 (1988).

Negahdaripour, S. "A Direct Method for Locating the Focus of Expansion." Computer Vision, Graphics, and Image Processing 46:303-326 (1989).

Horn, B. "Parallel Networks for Machine Vision." pp. 531-573.

Horn, B. "Rigid Body Motion from Range Image Sequences." CVGIP:Image Understanding 53(1):1-13 (1991).

Gottardi et al., "A CCD/CMOS Image Motion Sensor." IEEE International Solid-State Circuits Conference (1993).

Arreguit et al., "A CMOS Motion Detector System for Pointing Devices." IEEE International Solid-State Circuits Conference (1996).

McQuirk et al., "Estimating the Focus of Expansion in Analog VLSI." International J. of Computer Vision 28(3):261-277 (1998).

Galbraith et al., "Time-to-Collision Estimation from Motion Based on Primate Visual Processing." IEEE Transactions on Pattern Analysis and Machine Intelligence 27(8):1279-1291 (2005).

Horn, B. "Parallel Networks for Machine Vision." pp. 1-70, Massachusetts Institute of Technology, (1988 ).

* cited by examiner

Degrees of Freedom of Planar Surface
and Camera are constrained

Translational Motion
along Optical
Axis Perpendicular to Planar Surface p=q=0   Z=Z0

Case 1

Degree of Freedom of Planar Surface is constrained

Translational Motion
in Arbitrary Direction,
with Optical Axis Perpendicular
to Planar Surface p=q=0   Z=Z0

Case 2

FIG. 9

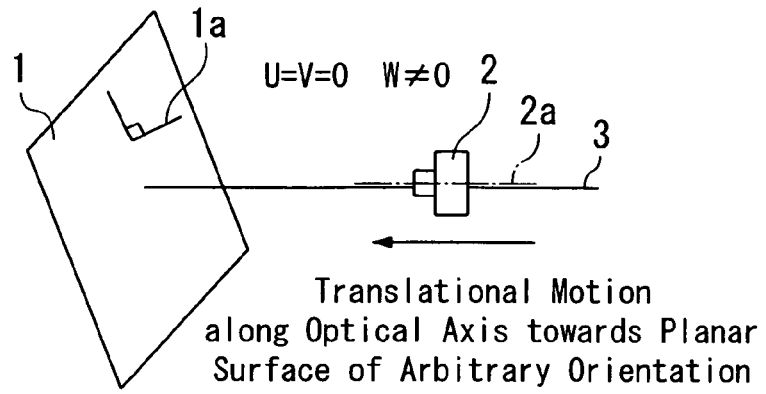

Degree of Freedom of Camera is constrained

U=V=0  W≠0

Translational Motion
along Optical Axis towards Planar
Surface of Arbitrary Orientation Case 3

FIG. 10

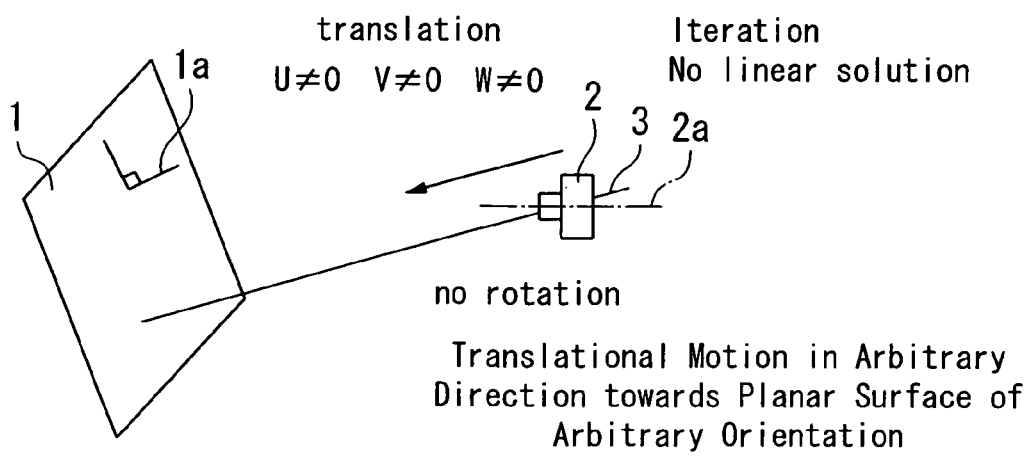

None of Degrees of Freedom of
Planar Surface and Camera are constrained translation
U≠0  V≠0  W≠0

Iteration
No linear solution no rotation

Translational Motion in Arbitrary
Direction towards Planar Surface of
Arbitrary Orientation Case 4

TIME-TO-CONTACT ESTIMATION DEVICE AND METHOD FOR ESTIMATING TIME TO CONTACT

BACKGROUND OF THE INVENTION

1. Field of the Invention

This invention relates to use of an imaging system to determine the time remaining before two objects or surfaces touch. The image sensor may, for example, be mounted on a manually, remotely or automatically operated vehicle of land, sea or air, or on a kinematic chain or robotic arm used in automated assembly or other factory automation.

2. Description of Related Art

Active systems using sonar, lasers, and radar are known in the art for estimating the distance or range to an object or to a point on an object. At times such systems can also be used to estimate velocity by differentiating the range, or by using the Doppler effect. The ratio of distance to velocity could then be used to estimate the time to contact. Such systems actively emit some form of radiation and detect radiation reflected from an object. The distance is estimated from the time delay between emitted and received radiation, the phase shift between emitted and received radiation or by a triangulation method where the radiation sensor is angularly separated from the radiation source.

Such "active" systems can be complex, expensive, subject to interference and limited in spatial resolution, or limited in application because of the need to actively emit radiation and the requirement that the object reflect the radiation. So-called "passive" systems instead do not emit radiation and work with natural illumination and reflection or emission of radiation from the object.

Passive optical systems include ones that estimate the distance using two imaging systems and a binocular stereo matching method. The time to contact could then be calculated if the velocity was known. Binocular stereo systems are expensive, require careful calibration, and make heavy computational demands because of the stereo matching operation (Lucas & Kanade 1981).

FIG. 16 illustrates the case in which a subject vehicle 10 is approaching another vehicle 20 traveling across the road on which subject vehicle 10 proceeds. As schematically shown in FIG. 16, the time to contact (TTC) could also be estimated by determining the image motion of certain characteristic "features" such as grey-level corners. Such features may also be edges, points or small areas identified by so-called "interest operators". However, "feature tracking" methods may be unreliable in estimation of the TTC when errors are contained in the extraction results of the features or feature points and in the calculation therewith in the case in which, for example, the feature points are erroneously correlated with each other, or in the case in which the feature points are erroneously extracted or not extracted and the correlations between the feature points are failed (schematically shown in FIG. 17). In addition, because the extraction of the feature points requires a significant amount of calculation, it is difficult to realize a high-speed estimation of the TTC. As a result, the "feature tracking" methods have not been used successfully to estimate the TTC.

Time to contact could be estimated by a two stage method based on "optical flow". "Optical flow" is a vector field that specifies the apparent motion of the image at each point in the image (Horn & Schunck 1981). The motion of the imaging system relative to the object could be estimated from the optical flow (Bruss & Horn 1983). The time to collision in turn could then be estimated from the relative motion if the distance to the object was known.

Methods for estimating optical flow have been known since the 1980s (Horn & Schunck 1981). The derivatives of image brightness in the spatial and time dimensions constrain the velocity components of the optical flow. Methods based on the spatial and temporal derivatives of image brightness are also known as "gradient-based" methods. Optical flow methods suffer from high computational cost, however, since the optical flow is usually estimated by numerically solving a pair of second order partial differential equations for the two components of velocity.

Optical flow can be estimated in a number of alternate ways, particularly if the result is only needed on a coarse grid or sparse set of points. One such alternative is a least-squares method based on the assumption that the optical flow velocity is constant or fixed within subimage blocks into which the full image is divided (sec. 4.3 in Horn 1988). Such a "fixed flow" method, while computationally less intensive than the full optical flow method above, suffers from limited resolution due to the assumption that the flow is constant within each block, and requires some means to determine what image block size presents a favorable compromise between resolution and accuracy.

Some optical mice estimate the lateral motion of the mouse over a surface by estimating the "fixed flow" using spatial and temporal derivatives of image brightness. See for example patents U.S. Pat. No. 5,793,357, U.S. Pat. No. 6,084,574, and U.S. Pat. No. 6,124,587.

Optical flow can be estimated instead by finding the shift of each block of an image frame relative to the previous frame that best brings it into alignment. The measure of how well image blocks match may be, for example, correlation, normalized correlation, sum of absolute values of differences, or sum of squares of differences (see e.g., Tanner & Mead 1984). These methods have the same disadvantages of low resolution as the previously mentioned method, and in addition are computationally expensive because of the need to search for the shift that yields the best match.

All optical flow based methods are subject to the so-called "aperture effect" which limits how accurately the optical flow can be estimated. The "aperture effect" is due to the inability of local image information to constrain the component of optical flow in the direction of the isophotes (i.e., perpendicular to the local brightness gradient).

Other methods proposed for estimating the "time to collision" attempt to simulate some assumed neural structure of biological vision systems (Galbraith et al 2005). These tend to be computationally extremely demanding, have low accuracy, and produce results only after a significant delay. Naturally, a collision warning system is of little practical use if it produces a warning only when it is too late to take evasive action.

In estimating rigid body motion, so-called "direct methods" have been proposed which avoid the two-stage approach by bypassing the estimation of the optical flow, instead working directly with spatial and temporal derivatives of image brightness. Methods for estimating rotation of a camera in a fixed environment, as well as method for estimating translation of a camera in a fixed environment have been described. See for example Horn & Negadharipour 1987 and Horn & Weldon 1988, which are hereby incorporated by reference. Such methods have, however, not previously been applied to the problem of determining the time to contact or time to collision.

In order for a method for determining time to contact to be of practical interest, it is necessary for a low end general purpose computer, or a cheap special purpose circuit (such as DSP, FPGA, PLD, or ASIC), to be able to perform the required computation. Furthermore, the result of the computation needs to be available almost immediately, for example, within one frame time of the image sequence being analyzed. This argues against extensive pipelining of the computation, which increases latency.

SUMMARY OF THE INVENTION

An object of the present invention is to provide a method for estimating the time to contact that is based on the time-varying images, or an image sequence from an imaging system, that is computationally efficient and has low latency, and to provide a time-to-contact estimation device as well.

In order to achieve the above object, the present invention provides a time-to-contact estimation device for estimating a time to contact of a moving body to an object in surroundings of the moving body, including: an image sensor provided on the moving body, and continuously capturing time-varying images of the surroundings of the moving body; a brightness change calculation unit calculating brightness changes in pixels between the time-varying images captured one after another; and a time-to-contact calculation unit calculating optimized brightness gradients based on the brightness changes calculated by the brightness change calculation unit, and calculating the time to contact of the moving body to the object based on the optimized brightness gradients.

According to the time-to-contact estimation device described above, the time to contact of the moving body to the object can be estimated by using a single image sensor (e.g., a camera).

Moreover, in contrast to a conventional twin-lens stereoscopic device or laser device, the time-to-contact estimation device of the invention does not require an accurate position adjustment for use. Therefore, if the time-to-contact estimation device of the invention is applied to a collision warning system for a vehicle, the system can be constructed at a lower cost when compared with the cases in which other types of sensors, such as a twin-lens stereoscopic device or a laser device, are employed.

Furthermore, because the time-to-contact estimation device of the invention only requires a single image sensor and a calculating computer as hardware, the size of the device can be made small. Therefore, the time-to-contact estimation device can be easily installed in a compact or subcompact car in which only a small space is available for the installation of sensors.

In the above time-to-contact estimation device, the time-to-contact calculation unit may calculate the optimized brightness gradients by obtaining a solution that minimizes a sum of the brightness changes in the pixels of at least a portion of the time-varying images.

In the above time-to-contact estimation device, the time-to-contact calculation unit may calculate the time to contact of the moving body to the object in different ways depending on whether at least either one of degree of freedom of the object and degree of freedom of the moving body is constrained or none of them are constrained.

In the above time-to-contact estimation device, when none of degrees of freedom of the object and the moving body are constrained, the time-to-contact calculation unit calculates the time to contact of the moving body to the object by executing an iteration process including plural calculations in which either one of an orientation of the object and a translation path of the moving body is assumed to be fixed in each of the calculations.

In the above time-to-contact estimation device, the time-to-contact calculation unit may determine whether at least either one of degree of freedom of the object and degree of freedom of the moving body is constrained or none of them are constrained depending on whether the object is a stationary object or a moving object.

In the above time-to-contact estimation device, the time-to-contact calculation unit may calculate the time to contact of the moving body to the object in different ways by classifying cases, depending on an orientation of a planar surface of the object and a translation path along which the moving body approaches the planar surface, into four cases including: a first case in which the planar surface is oriented perpendicular to an optical axis of the image sensor and the moving body approaches the planar surface along the optical axis; a second case in which the planar surface is oriented perpendicular to the optical axis and the moving body approaches the planar surface in an arbitrary direction; a third case in which the planar surface is arbitrarily oriented and the moving body approaches the planar surface along the optical axis; and a fourth case in which the planar surface is arbitrarily oriented and the moving body approaches the planar surface in an arbitrary direction.

The present invention further provides a method for estimating a time to contact of a moving body to an object in surroundings of the moving body, including: an image capturing step of continuously capturing, from the moving body, time-varying images of the surroundings of the moving body; a brightness change calculating step of calculating brightness changes in pixels between the time-varying images captured one after another; and a time-to-contact calculating step of calculating optimized brightness gradients based on the brightness changes calculated in the brightness change calculating step, and calculating the time to contact of the moving body to the object based on the optimized brightness gradients.

In the above method, the time-to-contact calculating step may include, for calculating the optimized brightness gradients, obtaining a solution that minimizes a sum of the brightness changes in the pixels of at least a portion of the time-varying images.

In the above method, in the time-to-contact calculating step, the time to contact of the moving body to the object may be calculated in different ways depending on whether at least either one of degree of freedom of the object and degree of freedom of the moving body is constrained or none of them are constrained.

In the above method, the time-to-contact calculating step may include, when none of degrees of freedom of the object and the moving body are constrained, executing an iteration process including plural calculations in which either one of an orientation of the object and a translation path of the moving body is assumed to be fixed in each of the calculations.

In the above method, in the time-to-contact calculating step, whether at least either one of degree of freedom of the object and degree of freedom of the moving body is constrained or none of them are constrained may be determined depending on whether the object is a stationary object or a moving object.

In the above method, in the time-to-contact calculating step, the time to contact of the moving body to the object may be calculated in different ways by classifying cases, depending on an orientation of a planar surface of the object and a translation path along which the moving body approaches the planar surface, into four cases including: a first case in which the planar surface is oriented perpendicular to an optical axis of the image sensor and the moving body approaches the planar surface along the optical axis; second case in which the planar surface is oriented perpendicular to the optical axis and the moving body approaches the planar surface in an arbitrary direction; a third case in which the planar surface is arbitrarily oriented and the moving body approaches the planar surface along the optical axis; and a fourth case in which the planar surface is arbitrarily oriented and the moving body approaches the planar surface in an arbitrary direction.

The method of the present invention uses the time-varying image from an imaging system, does not require careful calibration of the optical system, and is computationally efficient. The novel method for determining the time to contact is a "direct method" in the sense that it does not depend on the computation of the optical flow as an intermediate result. The novel method operates directly on the spatial and temporal derivatives of brightness. In that sense, it is a "gradient-based" method. The method is based on least-squares minimization of an error term that can in some simple cases be achieved in closed form. The computation comprises summation of certain sums of products of spatial and temporal derivatives of brightness and image coordinates over a region of interest, or over the whole image.

The method generally involves the following practical steps for each new image.

(1) Reset a set of accumulators to zero.
(2) Optionally preprocess an image in the image sequence or time-varying image. Preprocessing may comprise low pass filtering, block averaging and/or subsampling.
(3) Determine the spatial and temporal derivatives of image brightness at every picture cell (or every cell of the subsampled image).
(4) Compute certain sums of products of the derivatives and image coordinates at every picture cell (or every cell of the subsampled image). The particular terms to be computed depend on the specific assumptions made about relative motion and surface shape.
(5) Add these terms to totals held in the accumulators.
(6) After contributions from all picture cells (or cells of a subsampled image) have been added into the accumulated totals, compute the parameters of the relative motion and parameters of the surface shape. The parameters of relative motion may include up to three components of translational motion and up to three parameters of rotational motion. The parameters of surface shape may include surface distance, surface slopes, or more generally, coefficients of a series expansion of the surface shape, such as, for example, coefficients of a power series or a Fourier series.
(7) Calculate the time to contact from the motion and shape parameters. In the simplest case, the time to contact is the ratio of the distance to the surface and the speed with which the surface is being approached.

The above steps need not necessarily be performed in sequential order. For example, steps 2, 3, 4, and 5 may be interlaced by performing each of these steps for a picture cell before going onto the next picture cell, rather than performing step (2) on all picture cells, then performing step (3) on all picture cells and so on.

BRIEF DESCRIPTION OF THE DRAWINGS

FIG. 9 is a schematic diagram illustrating the relationship between a planer surface and a camera in Case 3 in which the degree of freedom of the camera is constrained.

FIG. 10 is a schematic diagram illustrating the relationship between a planer surface and a camera in Case 4 in which none of the degrees of freedom of the planar surface and the camera are constrained.

DETAILED DESCRIPTION OF THE INVENTION

Hereinafter preferred embodiments of the invention will be described with reference to the appended drawings.

Figure 1:
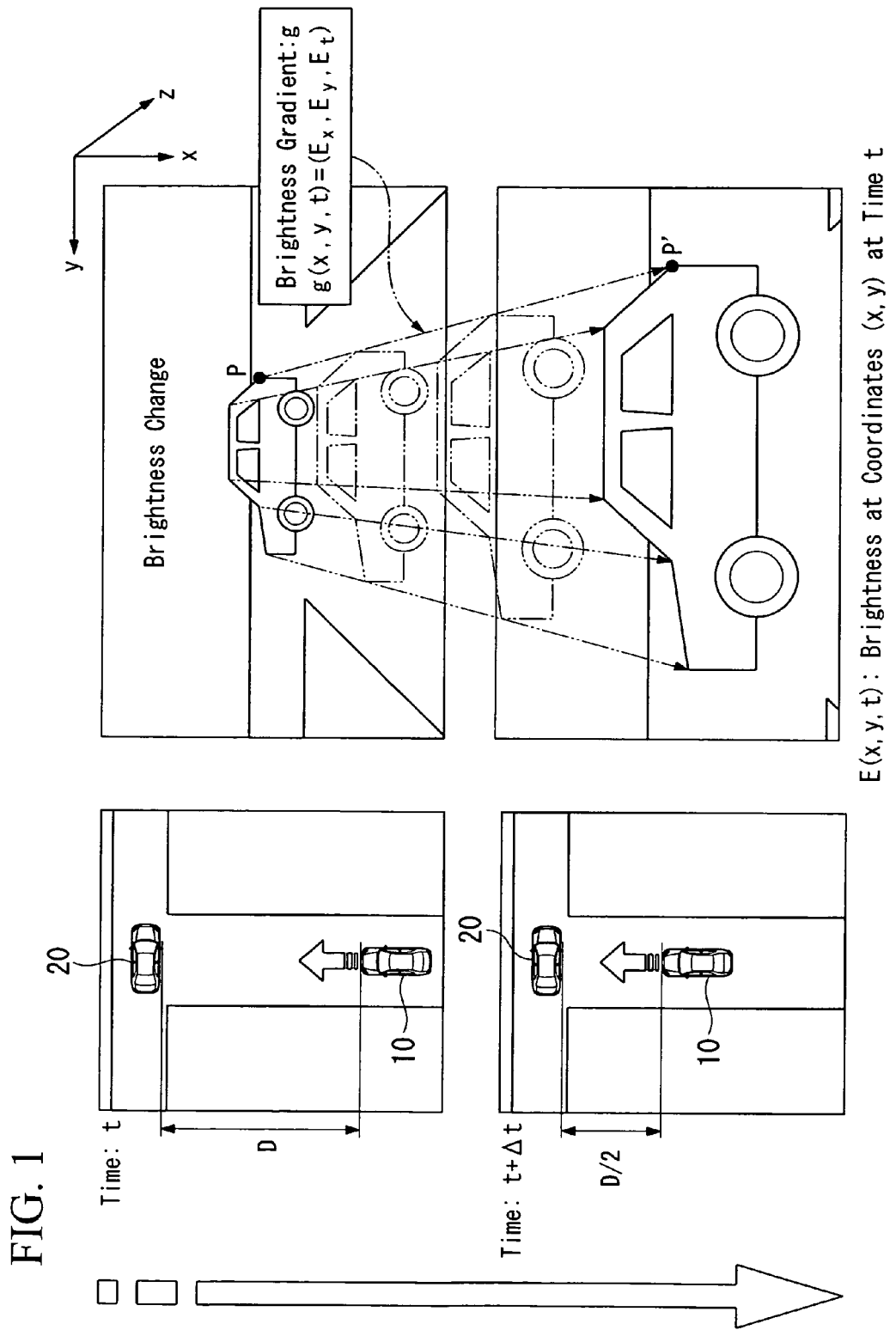
FIG. 1 is a schematic diagram illustrating a method for estimating the time to contact using a brightness gradient.

FIG. 1 is a schematic diagram illustrating a method for estimating the time to contact using a brightness gradient. FIG. 1 illustrates the case in which a subject vehicle 10 (a moving body) is approaching another vehicle 20 (an object) traveling across the road on which subject vehicle 10 proceeds.

Figure 2:
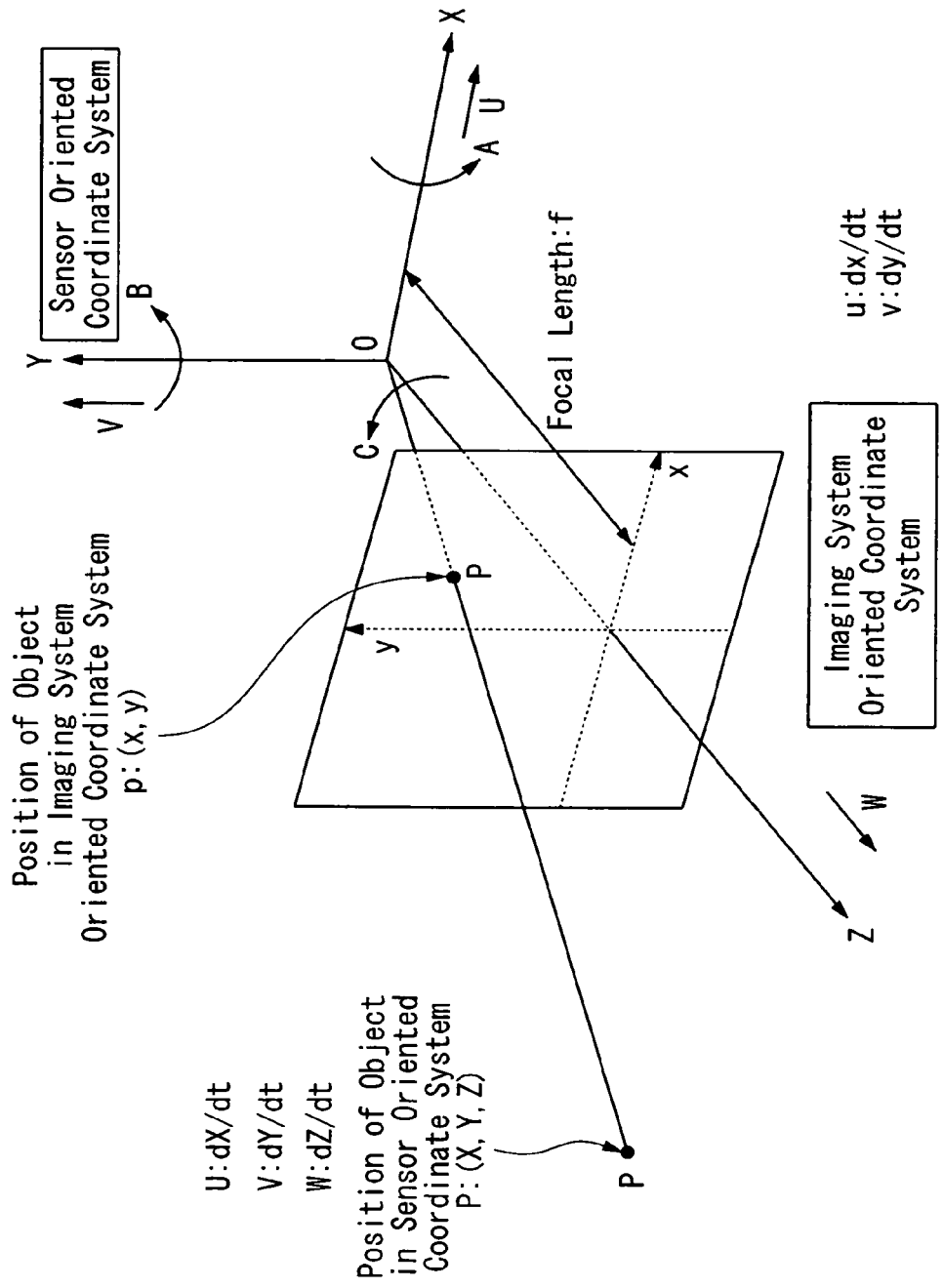
FIG. 2 is a schematic diagram illustrating definition of coordinate systems.

FIG. 2 is a schematic diagram illustrating definition of coordinate systems, in which the position p of the object is expressed by coordinates (x,y) in an imaging system oriented coordinate system, and the position P of the object is expressed by coordinates (X,Y,Z) in a sensor oriented coordinate system.

Figure 3:
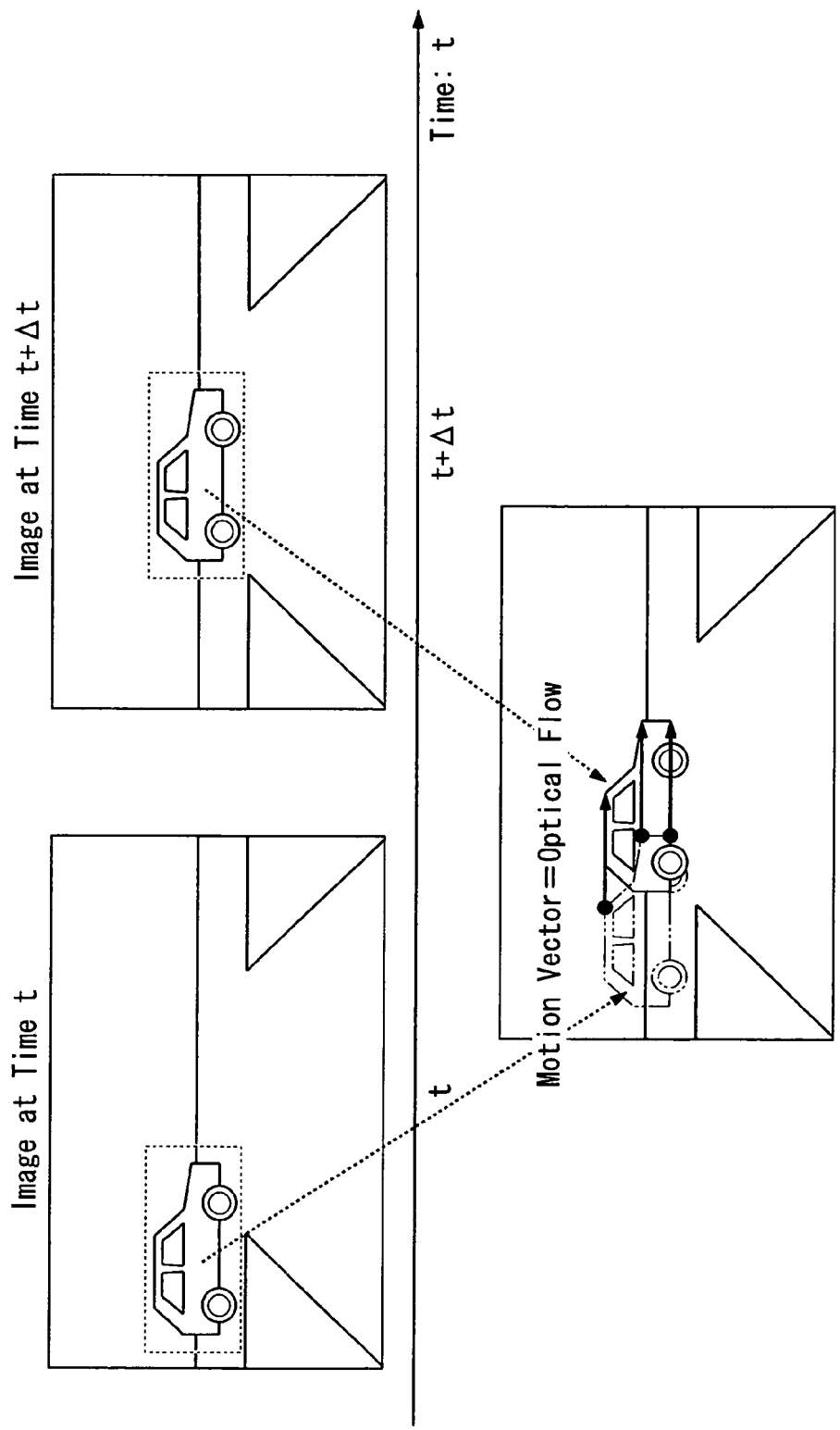
FIG. 3 is a schematic diagram illustrating conception of optical flow.
Figure 4:
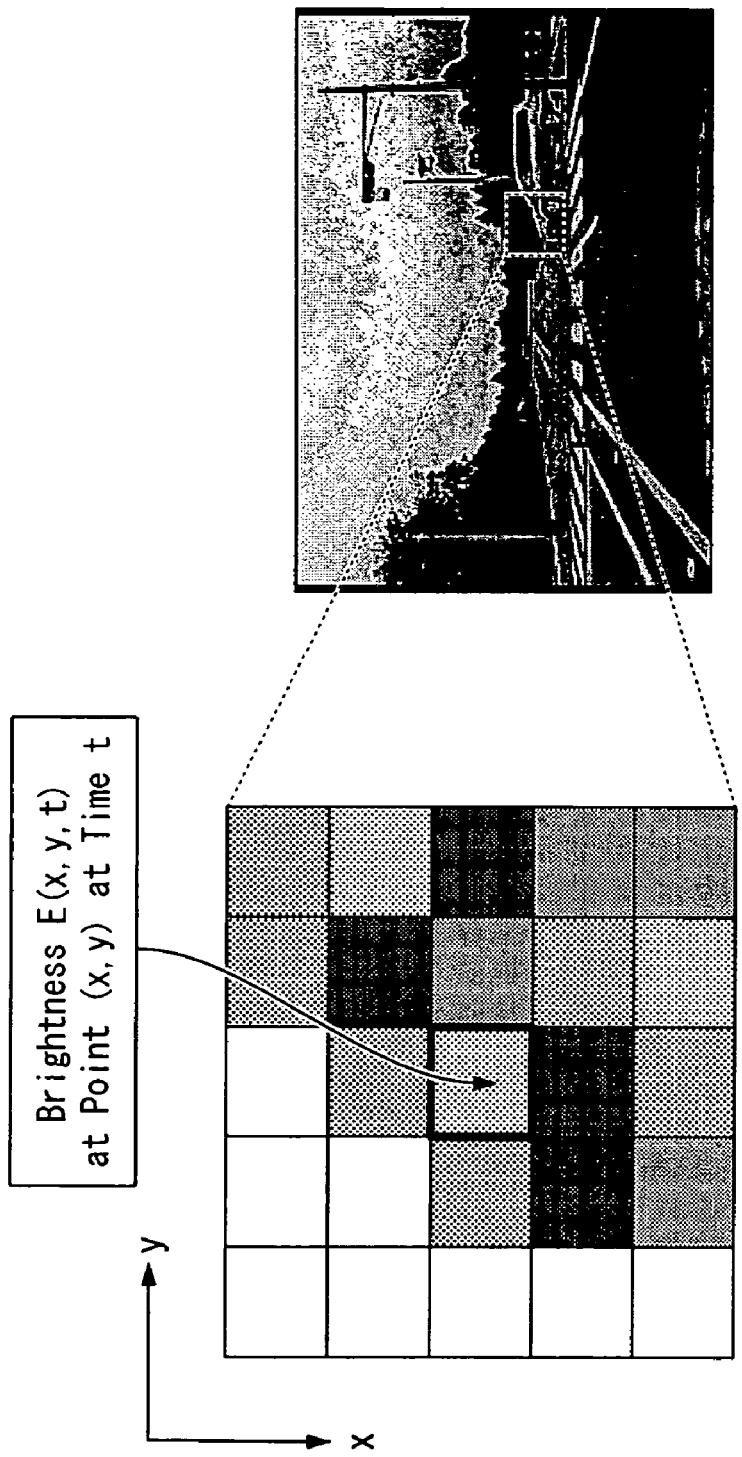
FIG. 4 is a schematic diagram illustrating conception of brightness acquisition.

FIG. 3 is a schematic diagram illustrating conception of optical flow. As shown in FIG. 3, the optical flow is defined by a motion vector drawn between consecutive images of an object, and is used to detect or measure motion of an object. Practically, the optical flow is calculated as a motion vector drawn between two points under assumption that a first point in a first image appears as a second point having the same brightness as the first point and shifted from the first point by a small amount in a subsequent second image. As shown in FIG. 4, the brightness at time t of a point P(x,y) in an image is expressed by E(x,y,t). Assuming that the point P moves by $(\Delta x, \Delta y)$ from time t to time $t+\Delta t$ while maintaining brightness thereof, following Equation (1) is satisfied.

$$E(x,y,t) = E(x+\Delta x, y+\Delta y, t+\Delta t) \qquad (1)$$

The Taylor's deployment is applied to the right side of Equation (1) and the second or higher order terms are neglected to obtain following Equation (2).

$$E(x, y, t) \cong E(x, y, t) + \frac{\partial E(x, y, t)}{\partial x}\Delta x + \frac{\partial E(x, y, t)}{\partial y}\Delta y + \frac{\partial E(x, y, t)}{\partial t}\Delta t \quad (2)$$

By dividing both sides by $\Delta t$ to obtain following Equation (3).

$$\frac{\partial E(x, y, t)}{\partial x}\frac{\Delta x}{\Delta t} + \frac{\partial E(x, y, t)}{\partial y}\frac{\Delta y}{\Delta t} + \frac{\partial E(x, y, t)}{\partial t} = 0 \quad (3)$$

The motion vector in the image is defined by following Equation (4);

$$(u, v) = \left(\frac{dx}{dt}, \frac{dy}{dt}\right) \quad (4)$$

the spatial gradient of the brightness is defined by following Equation (5); and $$(E_x, E_y) = \left(\frac{E(x, y, t)}{dx}, \frac{E(x, y, t)}{dy}\right) \quad (5)$$

the temporal gradient of the brightness is defined by following Equation (6).

$$E_t = \frac{E(x, y, t)}{dt} \quad (6)$$

Equation (3) is converted by using Equations (4), (5), and (6) to obtain following Equation (7).

$$E_x \cdot u + E_y \cdot v + E_t = 0 \quad (7)$$

Equation (7) is a brightness gradient constraint equation. Parameters u and v that satisfy Equation (7) define the optical flow, i.e., the motion vector to be obtained.

Figure 5:
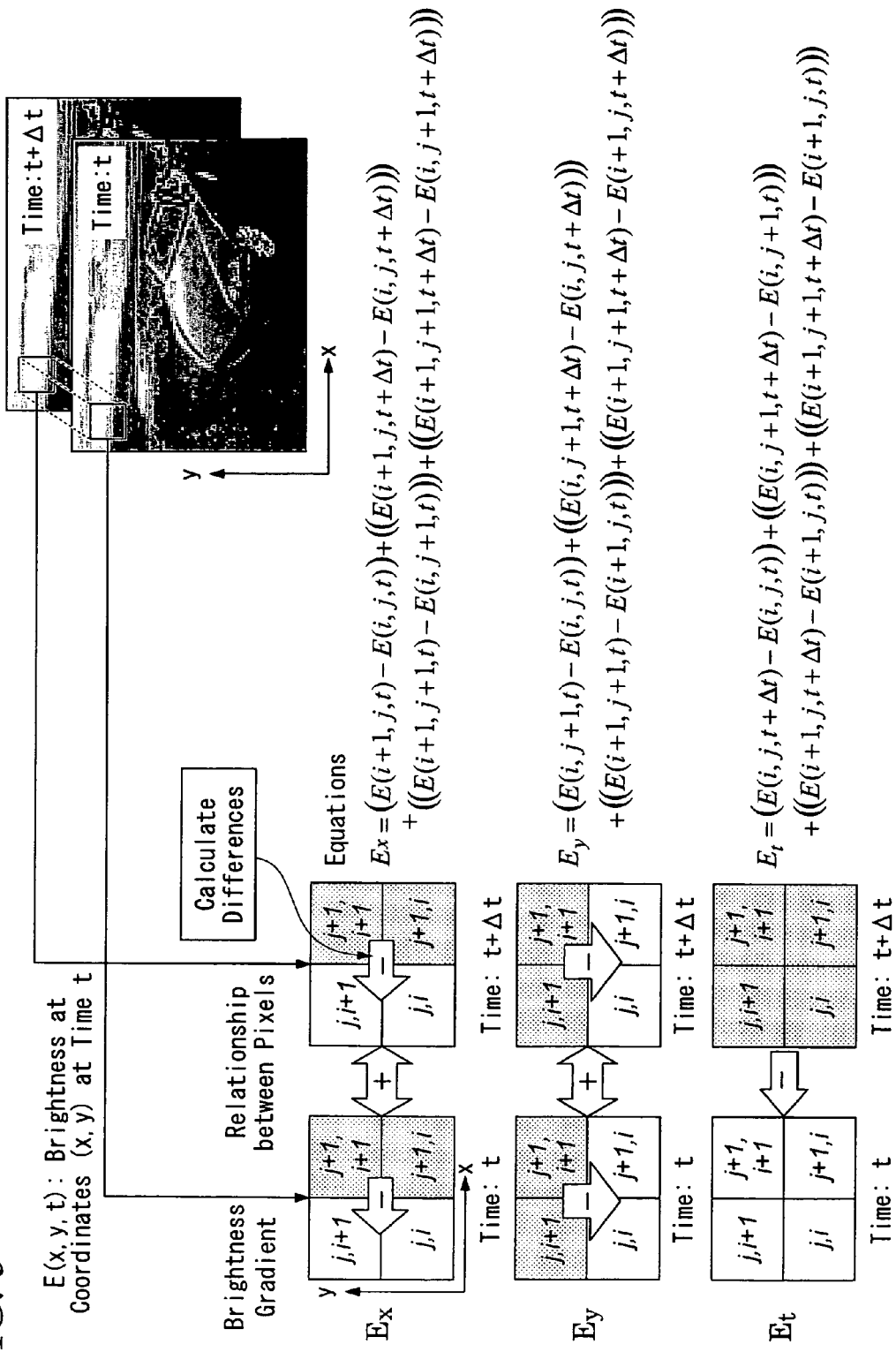
FIG. 5 is a schematic diagram illustrating a method for calculating derivatives of brightness.

As shown in FIG. 5, practically, $E_x$, $E_y$, and $E_t$ are calculated as follows by using the brightness of pixels adjacent to each other in the image at time t and at time t+$\Delta$t, where i and j are arbitrary coordinates in the image.

$$E_x = (E(i+1,j,t) - E(i,j,t)) + (E(i+1,j,t+\Delta t) - E(i,j,t+\Delta t)) + (E(i+1,j+1,t) - E(i,j+1,t)) + (E(i+1,j+1,t+\Delta t) - E(i,j+1,t+\Delta t)) \quad (8)$$

$$E_y = (E(i,j+1,t) - E(i,j,t)) + (E(i,j+1,t+\Delta t) - E(i,j,t+\Delta t)) + (E(i+1,j+1,t) - E(i+1,j,t)) + (E(i+1,j+1,t+\Delta t) - E(i+1,j,t+\Delta t)) \quad (9)$$

$$E_t = (E(i,j,t+\Delta t) - E(i,j,t)) + (E(i+1,j,t+\Delta t) - E(i+1,j,t)) + (E(i+1,j,t+\Delta t) - E(i+1,j,t)) + (E(i+1,j+1,t+\Delta t) - E(i+1,j+1,t)) \quad (10)$$

Figure 6:
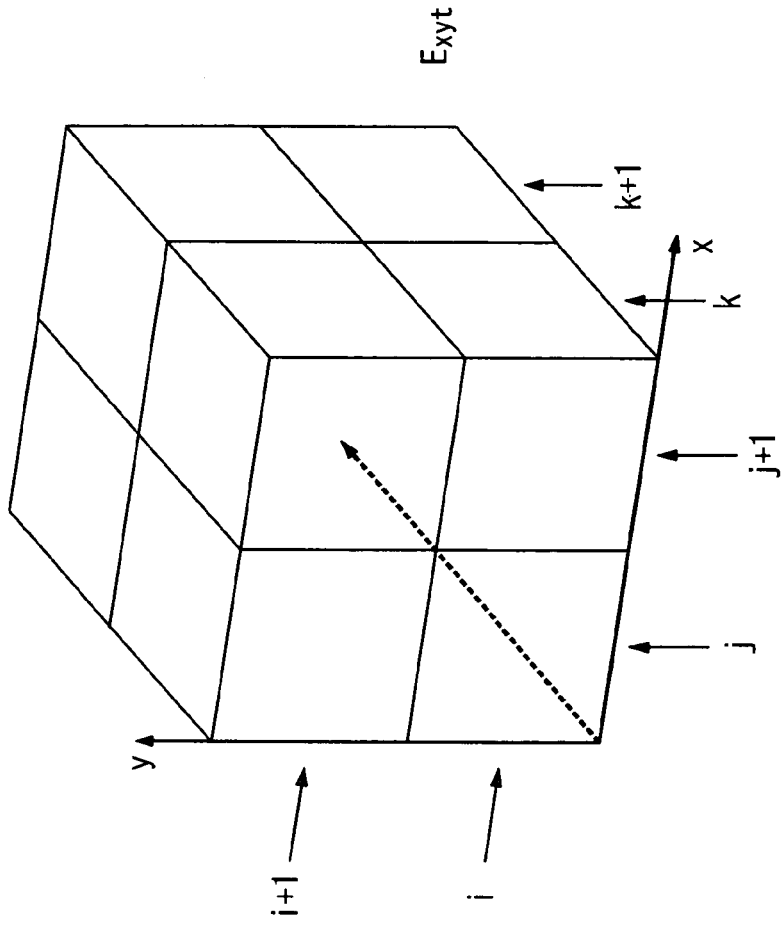
FIG. 6 is a schematic diagram illustrating expression of the derivatives of brightness by a cubic pixel.

$E_x$, $E_y$, and $E_t$ can also be expressed by using conception of a cubic pixel as shown in FIG. 6 (refer to Horn & Schunck 1981).

In the present invention, in order to accurately estimate the time to contact, the positional relationship between the object (a planar surface 1 in the figures) and the image sensor (a camera 2 in the figures) is classified into four cases shown in FIGS. 7 to 10.

Note that, in the following description, the term "the degree of freedom of the camera 2" is defined by whether or not the camera 2 moves along the optical axis 2a thereof, i.e., the degree of freedom of the camera 2 is deemed to be constrained when the camera 2 moves along the optical axis 2a, and the degree of freedom of the camera 2 is deemed not to be constrained when the camera 2 moves not necessarily along the optical axis 2a. Furthermore, the term "the degree of freedom of the planar surface 1" is defined by whether or not the planar surface 1 is oriented perpendicular to the optical axis 2a, i.e., the degree of freedom of the planar surface 1 is deemed to be constrained when the planar surface 1 is oriented perpendicular to the optical axis 2a, and the degree of freedom of the planar surface 1 is deemed not to be constrained when the planar surface 1 is not necessarily oriented perpendicular to the optical axis 2a.

Case 1

Figure 7:
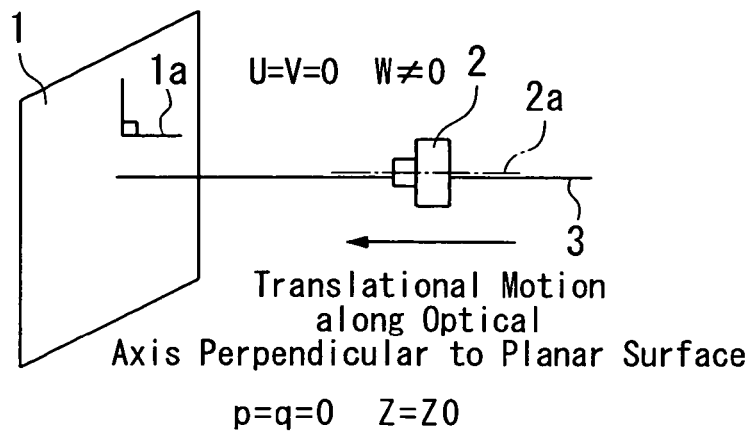
FIG. 7 is a schematic diagram illustrating the relationship between a planer surface and a camera in Case 1 in which the degrees of freedom of the planar surface and the camera are constrained.

In Case 1, as shown in FIG. 7, a translational motion of the camera 2 along a translation path 3, which is in parallel with the optical axis 2a of the camera 2 in this case, toward the planar surface 1 fixed perpendicular to the optical axis 2a (i.e., the normal 1a of the planar surface 1 is in parallel with the optical axis 2a and the translation path 3) is discussed. In this case, because the degrees of freedom of the planar surface 1 and the camera 2 are constrained, i.e., the camera 2 moves along the optical axis 2a thereof without rotational motion, the brightness gradient constraint equation is the simplest form. In addition, by assuming that the object to be considered is a planar surface that is oriented perpendicular to the optical axis 2a of the camera 2, motion vector (u,v) in the image (u=dx/dt, v=dy/dy) can be simply expressed as follows, $$u = x(W/Z), v = y(W/Z) \quad \text{C1-(1)}$$

and the time to contact TTC is expressed as follows, $$TTC = Z/W \quad \text{C1-(2)}$$

where W is speed of the camera 2 along the Z axis shown in FIG. 2, and Z is the distance to the planar surface 1.

By referring to above Equation (7), the brightness gradient constraint equation shown below is satisfied, $$rE_r C + E_t = 0 \quad \text{C1-(3)}$$

where C(=W/Z) is the inverse of the TTC.

In addition, following Equations C1-(4) are satisfied, where r is the radial distance from the principal point.

$$rE_r = xE_x + yE_y, \; r = \sqrt{x^2 + y^2} \quad \text{C1-(4)}$$

The unknown parameter C can be found based on Equation C1-(3) using the least squares method. By squaring the both sides of Equation C1-(3) and taking the sum, following summed-up term C1-(5) is obtained.

$$\Sigma (rE_r C + E_t)^2 \quad \text{C1-(5)}$$

Summed-up term C1-(5) is over all pixels of a region of interest (ROI), or possibly over the whole image. To find the best fit value of C, summed-up term C1-(5) is differentiated with respect to C, and the result is set to be zero.

$$2\Sigma (rE_r C + E_t) rE_r = 0 \quad \text{C1-(6)}$$

Equations C1-(6) can be converted into following Equation C1-(7).

$$C\Sigma(rE_r)^2 = -\Sigma rE_r E_t \qquad \text{C1-(7)}$$

The unknown C, which is the inverse of the TTC, can be obtained by the following Equation C1-(8)

$$C = -\Sigma rE_r E_t / \Sigma(rE_r)^2 \qquad \text{C1-(8)}$$

Figure 11:
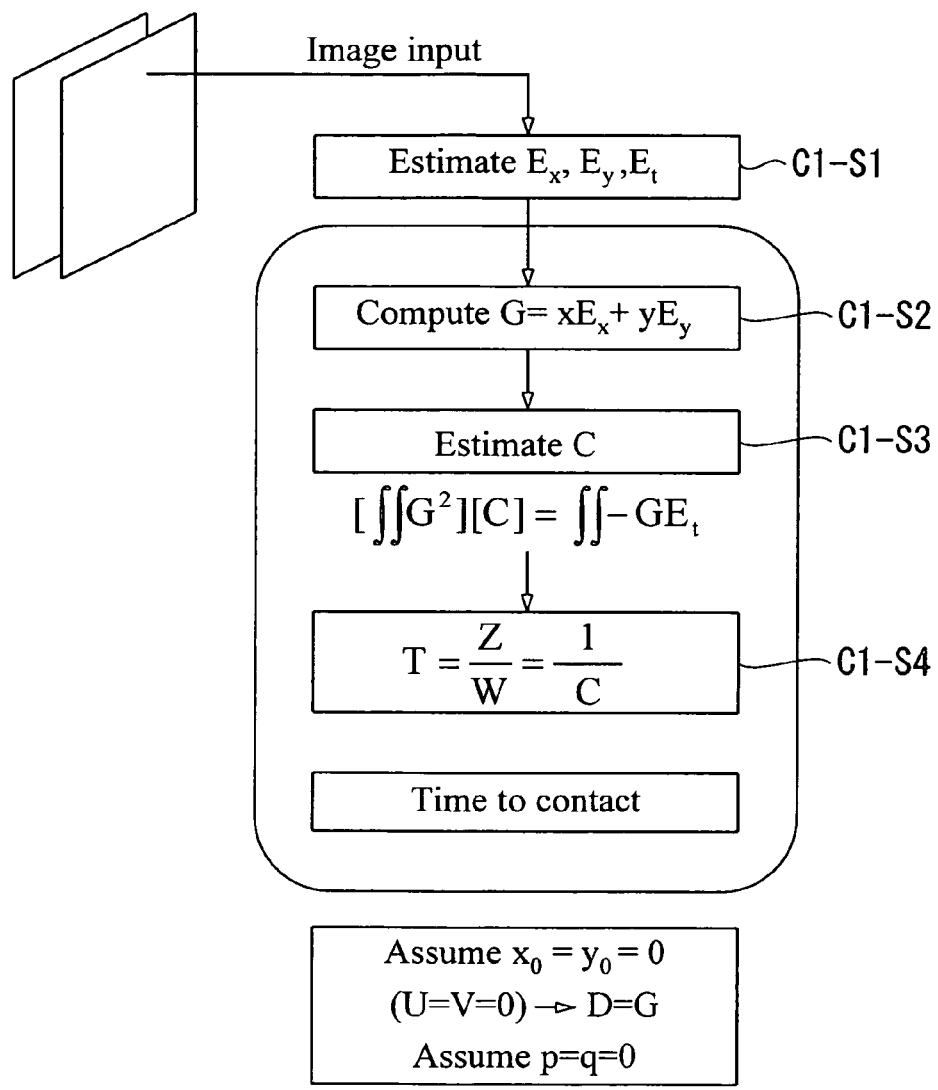
FIG. 11 is a schematic diagram illustrating an estimation flow for the time to contact in Case 1.

With reference to FIG. 11, the calculation steps of determining the TTC in Case 1 are as follows.
(1) Using two (or more) frames from an image sequence, calculate the derivatives $E_x$, $E_y$, and $E_t$ at every pixel in the region of interest from the brightness at the pixel in one image and the brightness at neighboring pixels in that image and the one before it (step C1-S1).
(2) At each pixel, compute the term $G=rE_r=xE_x+yE_y$, from that compute the terms $GE_t$ and $G^2$ (step C1-S2), and add these two terms, respectively.
(3) Estimate the unknown C using Equation C1-(8) (step C1-S3).
(4) Calculate the TTC as the inverse of C (step C1-S4).

The computation of the spatial and temporal derivatives preferentially uses a 2×2×2 cube of pixel brightness values (Horn & Schunck 1981). However, other methods of estimating derivatives can be used also, such as central differences, including methods that depend on more than two frames of the image sequence (although this may increase latency).

No significant amount of storage for intermediate results is needed, since the derivatives computed in step (1) are immediately used in step (2), and the terms computed in step (2) can be added into the accumulators in the immediately following step and so need not be retained.

Contributions to the accumulated totals can be weighted, so that, for example, more trustworthy information contributes more heavily to the final result. If this is done, the same weight factor should be applied to contributions to both accumulators. Information from an area of the image that has no significant texture, for example, may not provide a useful contribution to the accumulated totals. Also, areas in which specular highlights are observed may be suppressed in order to reduce error introduced by specular reflections.

It should be clear that the computation is very straightforward, with a number of arithmetic steps proportional to the number of pixels in the region of interest, that no search or iteration is involved and there is no need to solve complex equations.

Further, no detection of image "features" such as edges or grey-level corners is required. This makes it possible to implement the method on a small microprocessor (such as an Analog Devices BlackFin microprocessor) or even in special purpose circuitry such as FPGA, PLD or ASIC. In fact, the circuitry for performing the computation could even be integrated with the imaging sensor on the same. The same observations apply to the other cases studied below.

Case 2

Figure 8:
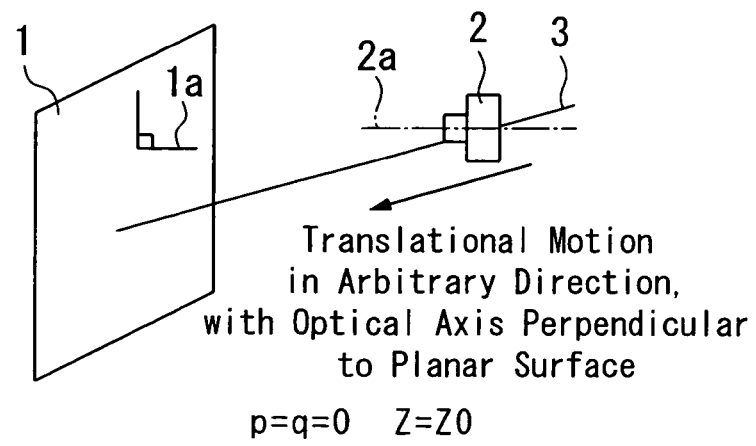
FIG. 8 is a schematic diagram illustrating the relationship between a planer surface and a camera in Case 2 in which the degree of freedom of the planar surface is constrained.

In Case 2, as shown in FIG. 8, a translational motion of the camera 2 along a translation path 3, which is arbitrarily determined in this case, toward the planar surface 1 fixed perpendicular to the optical axis 2a (i.e., the normal 1a of the planar surface 1 is in parallel with the optical axis 2a) is discussed. In this case, the degree of freedom of the planar surface 1 is constrained, and the degree of freedom of the camera 2 is not constrained, i.e., the camera 2 moves not necessarily along the optical axis 2a, or not necessarily along a line in parallel with the normal 1a of the planar surface 1. U, V, and W shown in FIG. 2 respectively indicate X, Y, and Z component of velocity in the sensor oriented coordinate system. With regard to these terms, following Equation C2-(1) (i.e., brightness gradient constraint equation) is satisfied, where f is focal length of the camera 2.

$$u=-f\cdot U/Z + x\cdot W/Z, \quad v=-f\cdot V/Z + y\cdot W/Z \qquad \text{C2-(1)}$$

It should be clear that Case 1 discussed above is simply a special case of Case 2 with U=V=0.

Here, the following brightness gradient constraint equation is satisfied, where $A=f\cdot U/Z$, $B=f\cdot V/Z$, and $C=W/Z$ (C is the inverse of the TTC as in above Case 1).

$$-AE_x - BE_y + rE_r C + E_t = 0 \qquad \text{C2-(2)}$$

In addition, as in above Case 1, following Equation C2-(3) is satisfied.

$$G=rE_r=xE_x+yE_y, \quad r=\sqrt{x^2+y^2} \qquad \text{C2-(3)}$$

The unknown parameters A, B, and C can be found based using the least squares method, where summed-up term is as follows.

$$\Sigma(-AE_x - BE_y + rE_r C + E_t)^2 \qquad \text{C2-(4)}$$

As in Case 1, summed-up term C2-(4) is over all pixels of a region of interest (ROI), or possibly over the whole image. To find the best fit values of A, B, and C, summed-up term C2-(4) is differentiated with respect to A, B, and C, and the three results are set to be zero.

$$\Sigma(-AE_x - BE_y + rE_r C + E_t)E_x = 0 \qquad \text{C2-(5)}$$

$$\Sigma(-AE_x - BE_y + rE_r C + E_t)E_y = 0 \qquad \text{C2-(6)}$$

$$\Sigma(-AE_x - BE_y + rE_r C + E_t)rE_r = 0 \qquad \text{C2-(7)}$$

These three linear equations containing the three unknown parameters A, B, and C can be solved easily using known methods such as Gaussian elimination.

Figure 12:
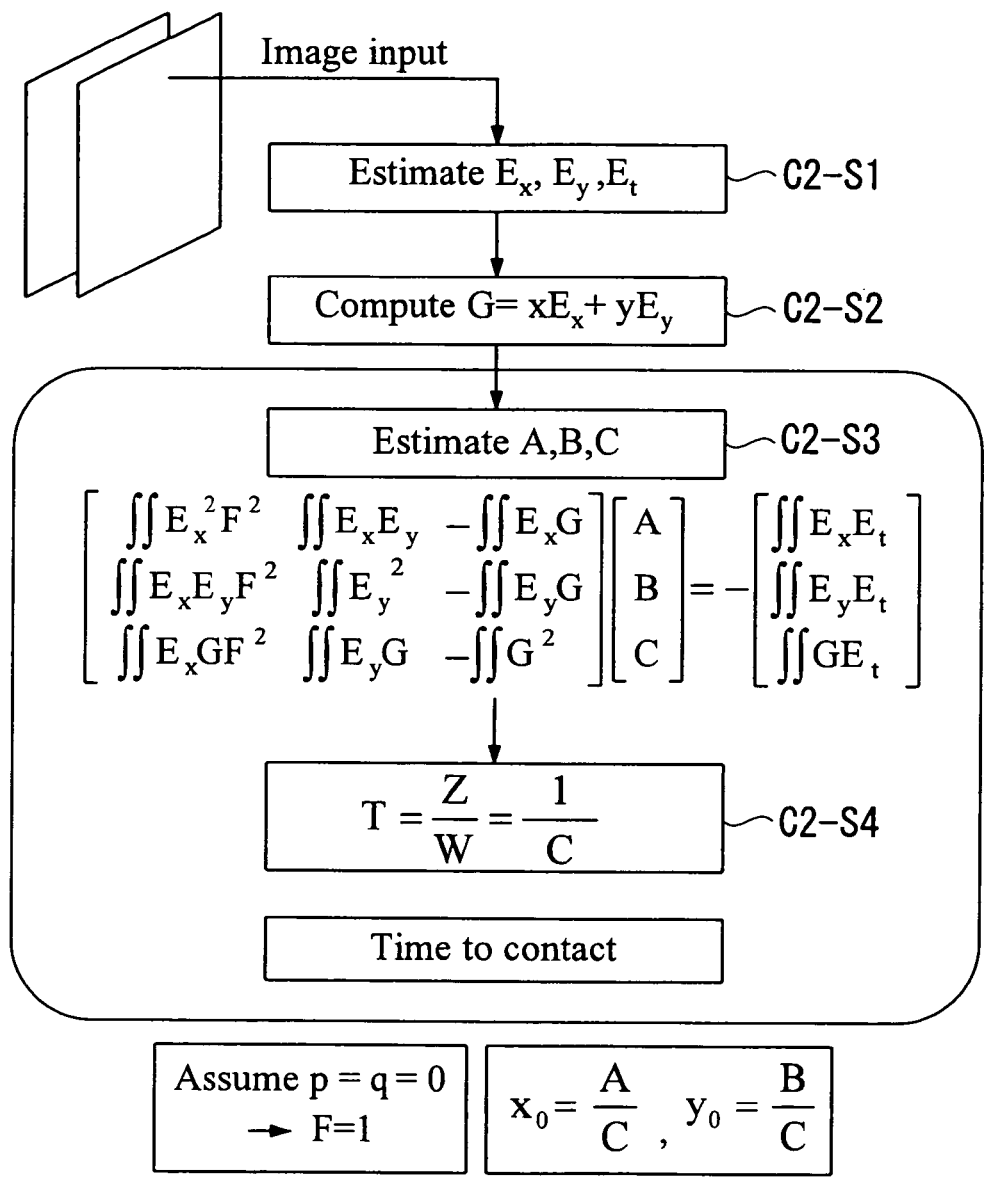
FIG. 12 is a schematic diagram illustrating an estimation flow for the time to contact in Case 2.

With reference to FIG. 12, the calculation steps of determining the TTC in Case 2 are as follows.
(1) Using two (or more) frames from an image sequence, calculate the derivatives $E_x$, $E_y$, and $E_t$ at every pixel in the region of interest from the brightness at the pixel in one image and the brightness at neighboring pixels in that image and the one before it (step C2-S1).
(2) At each pixel, compute the term $G=rE_r=xE_x+yE_y$ (step C2-S2).
(3) Estimate the unknown parameters A, B, and C based on Equations C2-(5), C2-(6), and C2-(7) (step C2-S3).
(4) Calculate the TTC as the inverse of C (step C2-S4).

Note that the six distinct quantities in the symmetric 3×3 coefficient matrix, and the three quantities in the right hand side vector are all sums of products of various combinations of brightness derivatives Ex, Ey, and Et and image coordinates x and y.

The time to contact is the inverse of C=(W/Z). The focal length f (principal distance) need not be known to compute the time to contact. As noted, Case 1 discussed above is a special case of case 2, with A=B=0. In that special case, only the third of the three equation above needs to be considered, and two of its terms drop out.

In addition to the time to contact, if desired, one can calculate the direction of translational motion by noting that $$U/W=(A/C)/f \text{ and } V/W=(B/C)/f.$$

The magnitude of the translational motion, however, cannot be determined in this fashion due to the scale factor ambiguity.

The results can be computed using essentially the same sequence of eight steps as in Case 1 above, except that now 9 (6 plus 3) accumulators are needed instead of two, and nine terms per picture cell need to be computed instead of just two.

If desired, the stability of the solution can be analyzed by determining the eigenvalues and eigenvectors of the symmetric 3×3 coefficient matrix above. The result is well constrained if none of the eigenvalues are particularly small. Conversely, the accuracy can be expected to be low if at least one of the eigenvalues is small.

Case 3

In Case 3, as shown in FIG. 9, a translational motion of the camera 2 along a translation path 3, which is in parallel with the optical axis 2a of the camera 2 in this case, toward the planar surface 1 of an arbitrary orientation (i.e., the normal 1a of the planar surface 1 is not necessarily in parallel with the optical axis 2a) is discussed. In this case, the degree of freedom of the camera 2 is constrained, and the degree of freedom of the planar surface 1 is not constrained.

When p and q are defined to be the slopes in the X and Y direction of the planar surface 1 measured in the imaging system coordinate system, the planar surface 1 is expressed by the following Equation C3-(1).

$$Z = Z0 + pX + qY \quad \text{C3-(1)}$$

$X = Z \cdot x/f$ and $Y = Z \cdot y/f$ are substituting into Equation C3-(1) to obtain following Equation C3-(2).

$$Z(1 - p(x/f) - q(y/f)) = Z0 \quad \text{C3-(2)}$$

By using the relationship among brightness, these motion vector constraint equations can be expressed by following Equation C3-(3).

$$rE_r(1 - p \cdot x/f - q \cdot y/f)(W/Z0) + E_t = 0 \quad \text{C3-(3)}$$

Equation C3-(3) is converted to obtain following Equation C3-(4), where $C = W/Z0$, $P = (p/f) \cdot C$, and $Q = (q/f) \cdot C$.

$$rE_r(C - Px - Qy) + E_t = 0 \quad \text{C3-(4)}$$

It should be clear that Case 1 discussed above is simply a special case of Case 3 with P=Q=0.

As in Cases 1 and 2, the unknown parameters P, Q, and C can be found based using the least squares method, where summed-up term is as follows.

$$\Sigma (rE_r(C - Px - Qy) + E_t)^2 \quad \text{C3-(5)}$$

As in Cases 1 and 2, summed-up term C3-(5) is over all pixels of a region of interest (ROI), or possibly over the whole image. To find the best fit values of P, Q, and C, summed-up term C3-(5) is differentiated with respect to P, Q, and C, and the three results are set to be zero.

$$\Sigma (rE_r(C - Px - Qy) + E_t) rE_r x = 0 \quad \text{C3-(6)}$$

$$\Sigma (rE_r(C - Px - Qy) + E_t) rE_r y = 0 \quad \text{C3-(7)}$$

$$\Sigma (rE_r(C - Px - Qy) + E_t) rE_r = 0 \quad \text{C3-(8)}$$

These three linear equations containing the three unknown parameters P, Q, and C can be solved easily using known methods such as Gaussian elimination.

Figure 13:
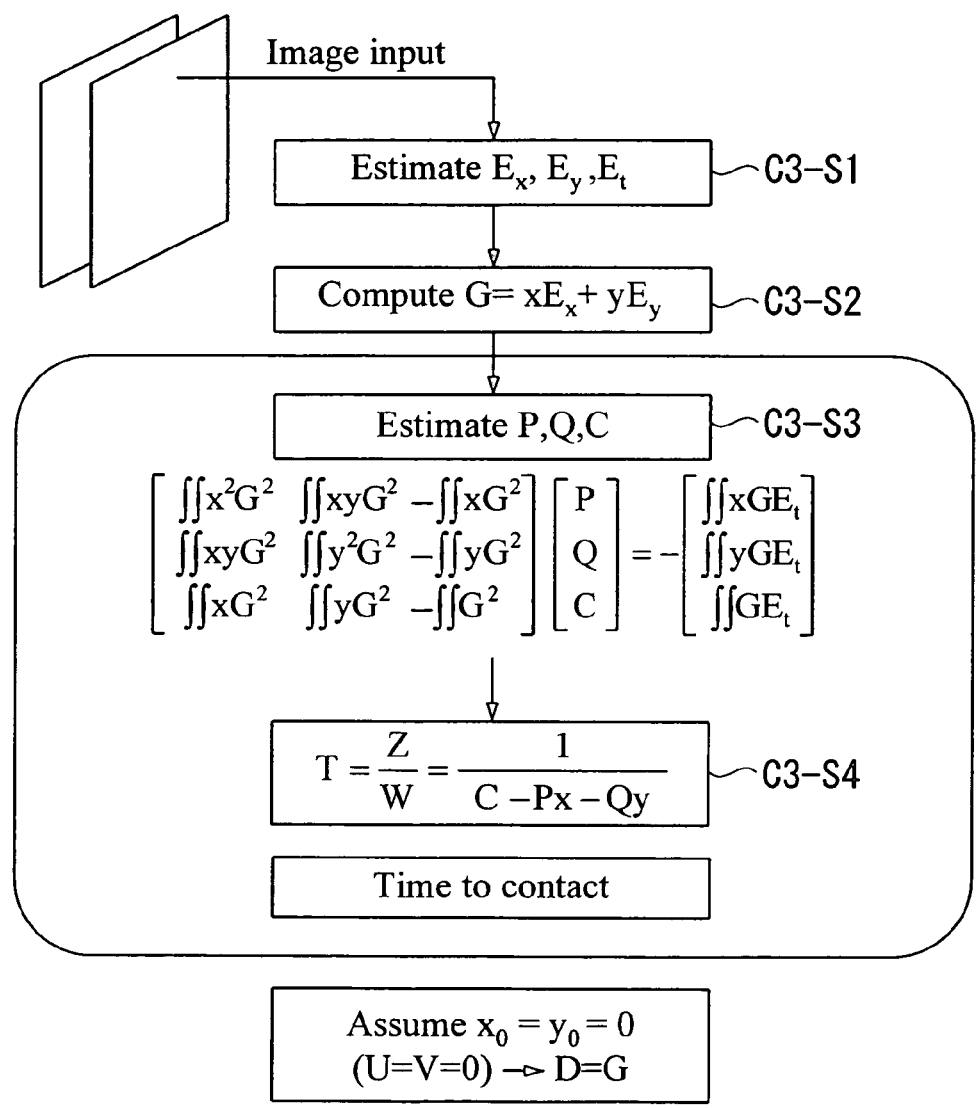
FIG. 13 is a schematic diagram illustrating an estimation flow for the time to contact in Case 3.

With reference to FIG. 13, the calculation steps of determining the TTC in Case 3 are as follows.

(1) Using two (or more) frames from an image sequence, calculate the derivatives $E_x$, $E_y$, and $E_t$ at every pixel in the region of interest from the brightness at the pixel in one image and the brightness at neighboring pixels in that image and the one before it (step C3-S1).

(2) At each pixel, compute the term $G = rE_r = xE_x + yE_y$ (step C3-S2).

(3) Estimate the unknown parameters P, Q, and C based on Equations C3-(6), C3-(7), and C3-(8) (step C3-S3).

(4) Calculate the TTC as the inverse of C (step C3-S4).

Note that the nine quantities in the symmetric 3×3 coefficient matrix, and the three quantities in the right hand side vector are all sums of products of brightness derivatives $E_x$, $E_y$, and $E_t$ and image coordinates x and y.

The time to contact is the inverse of $C = (W/Z0)$. The focal length f (principal distance) need not be known to compute the time to contact. It should be noted again that Case 1 discussed above is a special case of this one with P=Q=0. In this case, only the third of the three equations above need be considered, and two of its terms drop out.

If desired, one can also calculate the orientation of the planar surface by noting that $$p = f(P/C) \text{ and } q = f(Q/C).$$

The results can be computed using essentially the same sequence of eight steps as in case 1 above, except that now 9 (6 plus 3) accumulators are needed instead of two, and nine terms per picture cell need to be computed instead of just two.

If desired, the stability of the solution can be analyzed by determining the eigenvalues and eigenvectors of the symmetric 3×3 coefficient matrix above. The result is well constrained if none of the eigenvalues are particularly small. Conversely, the accuracy can be expected to be low if at least one of the eigenvalues is small.

The general approach should be clear from the above three cases worked out in detail above. Below described is an additional extension to more general case.

Case 4

In Case 4, as shown in FIG. 10, a translational motion of the camera 2 along a translation path 3, which is arbitrarily determined in this case, toward the planar surface 1 of an arbitrary orientation (i.e., the normal 1a of the planar surface 1 is not necessarily in parallel with the optical axis 2a) is discussed. In this case, none of the degrees of freedom of the camera 2 and the planar surface 1 are constrained.

Combining the equations for the motion field from Case 2 and the equation for the planar surface from Case 3 in the brightness change constraint equation, following Equation C4-(1) is obtained.

$$(A'E_x + B'E_y - rE_r)(-Px - Qy + C) + E_t = 0 \quad \text{C4-(1)}$$

where $A' = f \cdot (U/W)$, $B' = f \cdot (V/W)$, $P = (p/f) \cdot (W/Z0)$, $Q = (q/f) \cdot (W/Z0)$ As before, $C = (W/Z0)$ is the inverse of the time to contact. This can also be written in the alternate form below.

$$(AE_x + BE_y - C(rE_r))(-P'x - Q'y + 1) + E_t = 0 \quad \text{C4-(2)}$$

where $A = f \cdot (U/Z0)$, $B = f \cdot (V/Z0)$, $P' = p/f$, $Q' = q/f$

Note that Case 1 is just a special Case of case 4, with A=B=U=V=0, and correspondingly, Cases 2 and 3 are special cases of this general case with A=B=0 and U=V=0, respectively.

The least-squares method is applied to find the five unknown parameters A', B', C, P and Q, where summed-up term is as follows.

$$\Sigma ((A'E_x + BE_y - rE_r)(-Px - Qy + C) + E_t)^2 \quad \text{C4-(3)}$$

Similarly, the least-squares method is applied to find the five unknown parameters A, B, C, P' and Q', where summed-up term is as follows.

$$\Sigma((AE_x+BE_y-C(rE_r))(-P'x-Q'y+1)+E_t)^2 \qquad \text{C4-(4)}$$

Summed-up terms C4-(3) and C4-(4) are over all pixels of a region of interest (ROI), or possibly over the whole image. Note that A, B, P, Q are related to A', B', P' and Q' by the following equations.

$$A=A'C,\ B=B'C,\ P=P'C,\ Q=Q'C$$

To find the best fit values of the five unknown parameters we can differentiate either of the two sums with respect to the five parameters and set the results equal to zero. This leads to five equations in five unknowns. All of the coefficients of these equations are sums of products of image brightness derivatives and image coordinates, as before. Unlike Cases 1 to 3 described above, however, the equations are no longer linear and so not quite so easy to solve, and two solutions will be discussed below.

Solution 1

In Solution 1, an iteration process is applied to find unknown parameters defining the time to contact (TTC). First, parameters P' and Q' are treated as constants, then the equations derived from summed-up term C4-(4) are linear in the remaining unknown parameters A, B, and C, and known linear solution methods can be applied to obtain the best fit values of A, B, and C. Next, parameters A' and B' are treated as constants, then the equations derived from summed-up term C4-(3) are linear in the remaining unknown parameters P, Q, and C, and known linear solution methods can be applied to obtain the best fit values of P, Q, and C. By executing an iteration process for these calculations, approximation of the TTC can be obtained.

The specific procedure is now explained. First, parameters P' and Q' are treated as constants. To find the best fit values of A, B, and C, summed-up term C4-(4) is differentiated with respect to A, B, and C, and the three results are set to be zero.

$$A\Sigma E_x^2 F^2 + B\Sigma E_x^2 E_y F^2 - C\Sigma rE_r E_x F^2 = -\Sigma E_x E_t F \qquad \text{C4-(5)}$$

$$A\Sigma E_x^2 F^2 + B\Sigma E_x^2 E_y F^2 - C\Sigma rE_r E_x F^2 = -\Sigma E_y E_t F \qquad \text{C4-(6)}$$

$$A\Sigma E_x^2 F^2 + B\Sigma E_x^2 E_y F^2 - C\Sigma rE_r E_x F^2 = -\Sigma rE_r E_t F \qquad \text{C4-(7)}$$

where $F=1-(p/f)x-(q/f)y$.

Next, parameters A' and B' are treated as constants. To find the best fit values of P, Q, and C, summed-up term C4-(3) is differentiated with respect to P, Q, and C, and the three results are set to be zero.

$$P\Sigma D^2 x^2 + Q\Sigma D^2 xy - C\Sigma D^2 x = \Sigma D x E_t \qquad \text{C4-(8)}$$

$$P\Sigma D^2 xy + Q\Sigma D^2 y^2 - C\Sigma D^2 y = \Sigma D y E_t \qquad \text{C4-(9)}$$

$$P\Sigma D^2 x + Q\Sigma D^2 y - C\Sigma D^2 = \Sigma D E_t \qquad \text{C4-(10)}$$

where $D=A'E_x+B'E_y-rE_r$.

Thus, given an initial guess, one can alternately solve for A, B, and C, assuming P and Q are fixed, and then, using the new estimates of A, B, solve for P, Q and C, assuming that A and B are fixed. A few iterations of this pair of steps typically yields a close enough approximation to the exact solution.

Figure 14:
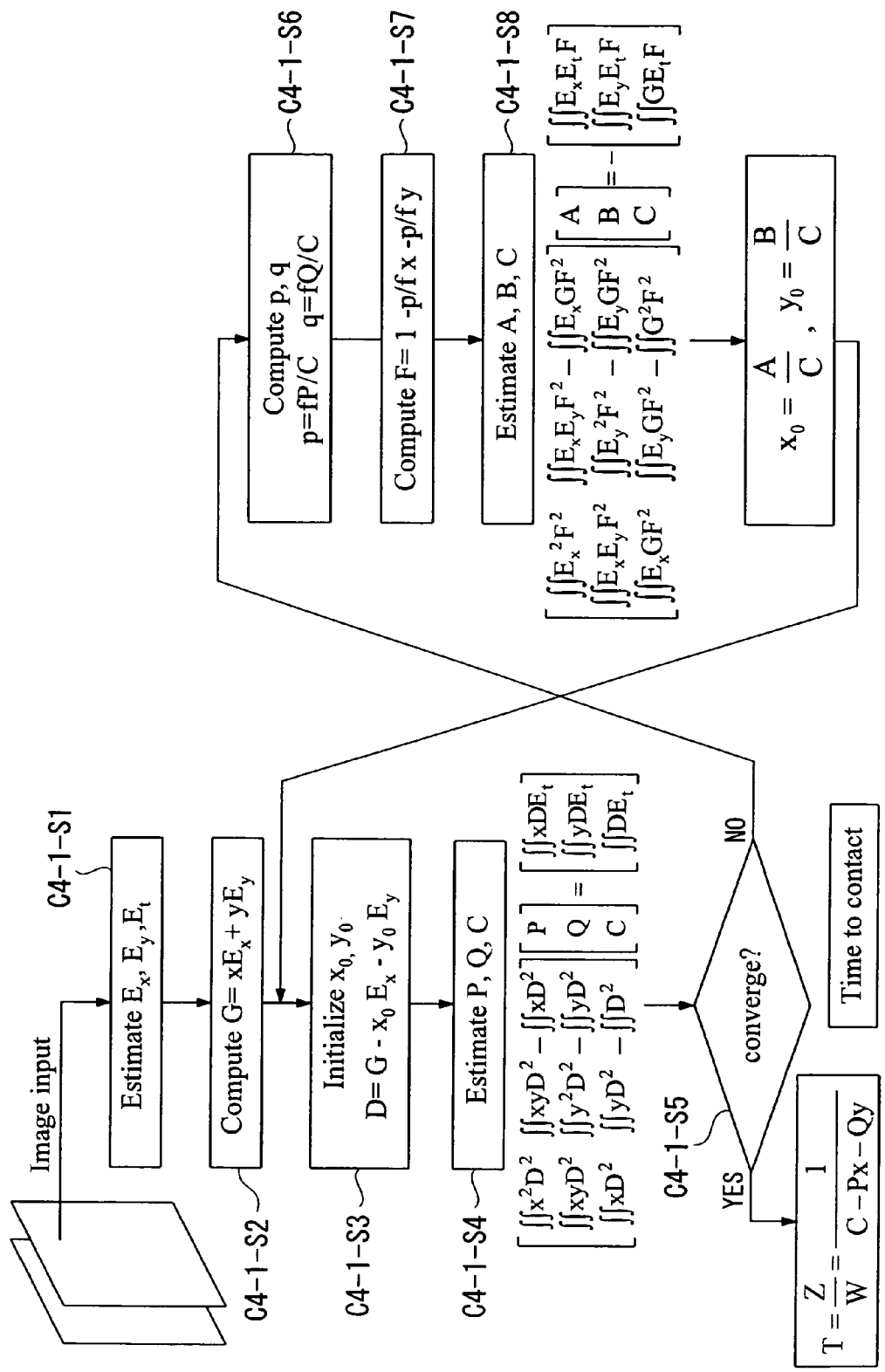
FIG. 14 is a schematic diagram illustrating an estimation flow for the time to contact according to Solution 1 in Case 4.

With reference to FIG. 14, the calculation steps of estimating the TTC in Solution 1 are as follows.

(1) Using two (or more) frames from an image sequence, calculate the derivatives (brightness gradients) $E_x$, $E_y$, and $E_t$ at every pixel in the region of interest from the brightness at the pixel in one image and the brightness at neighboring pixels in that image and the one before it (step C4-1-S1).

(2) At each pixel, compute the term $G=rE_r=xE_x+yE_y$ (step C4-1-S2).

(3) Calculate initial values (step C4-1-S3).

(4) Estimate the unknown parameters P, Q, and C (step C4-1-S4).

(5) Determine whether the solutions have been converged (step C4-1-S5). If the solutions have been sufficiently converged, the processing is terminated, and if not, the following steps are carried out.

(6) Calculate p and q (step C4-1-S6).

(7) Calculate $F(=1-p/f\cdot x-p/f\cdot y)$ (step C4-1-S7).

(8) Estimate the unknown parameters A, B, and C (step C4-1-S8), then return to step (3).

Solution 2

By using Solution 2, an approximation to the TTC can be obtained.

First, following terms C4-(11) and C4-(12) are derived from Equations C4-(1) and C4-(2).

$$(E_x\ E_y\ -rE_r)(A\ B\ C)^T(-P'\ -Q'\ 1)(x\ y\ 1)^T+E_t \qquad \text{C4-(11)}$$

$$(E_x\ E_y\ -rE_r)(A'\ B'\ C)^T(-P\ -Q\ C)(x\ y\ 1)^T+E_t \qquad \text{C4-(12)}$$

Suffix T denotes the transpose, which turns a row vector into a column vector (and vice versa). These expressions in turn can be rewritten using the product of a vector, a 3×3 matrix M, and another vector:

$$(E_x\ E_y\ -rE_r)M(x\ y\ 1)^T+E_t \qquad \text{C4-(13)}$$

where M is the dyadic product of the vectors $(A\ B\ C)^T$ and $(-P'\ -Q'\ 1)^T$, or equivalently of $(A'\ B'\ 1)^T$ and $(-P\ -Q\ C)^T$, namely:

$$M = \begin{pmatrix} -AP & -AQ & A \\ -BP & -BQ & B \\ -CP & -CQ & C \end{pmatrix} = \begin{pmatrix} -A'P & -A'Q & A'C \\ -B'P & -B'Q & B'C \\ -P & -Q & C \end{pmatrix} \qquad \text{C4-(14)}$$

A linear least squares method may now be used to find the nine unknown coefficients of the 3×3 matrix M, if these parameters are treated as independent variables for the moment. The term above can be written in the form $(e^T m+E_t)$, and so the sum to be minimized is $$\Sigma(e^T m+E_t)^2 \qquad \text{C4-(15)}$$

where m is a vector obtained by "flattening" the matrix M, that is, by lining up the nine coefficients of the matrix, and e is a vector obtained by flattening the dyadic product of the vectors $(-E_x\ -E_y\ (rE_r))^T$ and $(x\ y\ 1)^T$.

$$m=\text{Flatten}(((A\ B\ C)^T(-P'\ -Q'\ 1)) \qquad \text{C4-(16)}$$

$$m=\text{Flatten}(((A'\ B'\ 1)^T(-P\ -Q\ C)) \qquad \text{C4-(17)}$$

$$e=\text{Flatten}(((E_x\ E_y\ -rE_r)^T(x\ y\ 1)) \qquad \text{C4-(18)}$$

From Equations C4-(16), C4-(17), and C4-(18), following Equations C4-(19), C4-(20), and C4-(21) are obtained.

$$m=(-AP'\ -AQ'\ A\ -BP'\ -BQ'\ B\ -CP'\ -CQ'\ C) \qquad \text{C4-(19)}$$

$$m=(-A'P\ -A'Q\ A'C\ -B'P\ -B'Q\ B'C\ -P\ -Q\ C) \qquad \text{C4-(20)}$$

$$e=(xE_x\ yE_x\ E_x\ xE_y\ yE_y\ E_y\ -xrE_r\ -yrE_r\ -rE_r) \qquad \text{C4-(21)}$$

By differentiating term C4-(15) with respect to the vector m, and setting the result equal to zero, following Equations C4-(22) and C4-(23) are obtained.

$$2\Sigma(e^T m + E_t)e = 0 \qquad \text{C4-(22)}$$

$$2\Sigma(ee^T)m = -\Sigma E_t e \qquad \text{C4-(23)}$$

This is a set of 9 linear equations in the nine coefficients of the matrix which can be solved using known methods, such as Gaussian elimination. The coefficients of the symmetric 9×9 matrix and the vector on the right hand side of the equation are all sums of products of derivatives of brightness and image coordinates. These terms can be accumulated as before, except that now there are 54 (45 plus 9) accumulators, and 54 terms per picture cell need to be computed for addition into these accumulators.

Finally, the five unknown parameters A, B, C, P', and Q' or equivalently A', B', C, P and Q can be recovered using singular value decomposition of the matrix M.

Alternatively, in this special case, they can be found by noting that each column of the matrix should be proportional to (A, B, C), and each row of the matrix should be proportional to (−P, −Q, C). In fact, the four unknown parameters A, B, P, and Q can be read off from the last row and the last column of the matrix M, reconstituted from the flattened version, the vector m.

However, the 3×3 matrix resulting from this computation may have an arbitrary factor lambda ($\lambda$) added to each of the three diagonal terms since $$-xE_x - yE_y + (rE_r) = 0.$$

The correct diagonal can be determined using singular value decomposition, or in this particular case more easily from relationships with the off diagonal terms:

$$M11 = M12 \cdot M31/M32 = M21 \cdot M13/M23 \qquad \text{C4-(24)}$$

$$M22 = M12 \cdot M23/M13 = M21 \cdot M32/M31 \qquad \text{C4-(25)}$$

$$M33 = M32 \cdot M13/M12 = M23 \cdot M31/M21 \qquad \text{C4-(26)}$$

Equation C4-(26) yields C, which is the inverse of the TTC. For purposes of determining the time to contact, only that bottom right coefficient of the matrix (Equation C4-(26)) actually is needed.

Solution 2 does not solve exactly the same least squares problem as that solved by Solution 1 described above, but does produce a result in convenient closed form. In the absence of measurement noise, the results will be the same. With noise in the measurement of image brightness, and hence in $E_x$, $E_y$ and $E_t$, the result of Solution 2 will be an approximation to the original solution. This is because the nine elements of the matrix M are not independent, but depend on the five unknown parameters. This approximate solution may be sufficient enough to be used directly or can be used as an initial guess for the non-linear numerical solution of the original least-squares problem using iterative methods (i.e., for Solution 1).

As before, the time to contact is the inverse of the parameter C. This calculation can be performed without knowing the principal distance f.

If desired, the direction of translational motion, given by $$U/W = (A/C)/f \qquad \text{C4-(27)}$$

$$V/W = (B/C)/f \qquad \text{C4-(28)}$$

can also be calculated, as can the orientation of the surface specified by $$p = f(P/C) \text{ and } q = f(Q/C).$$

Figure 15:
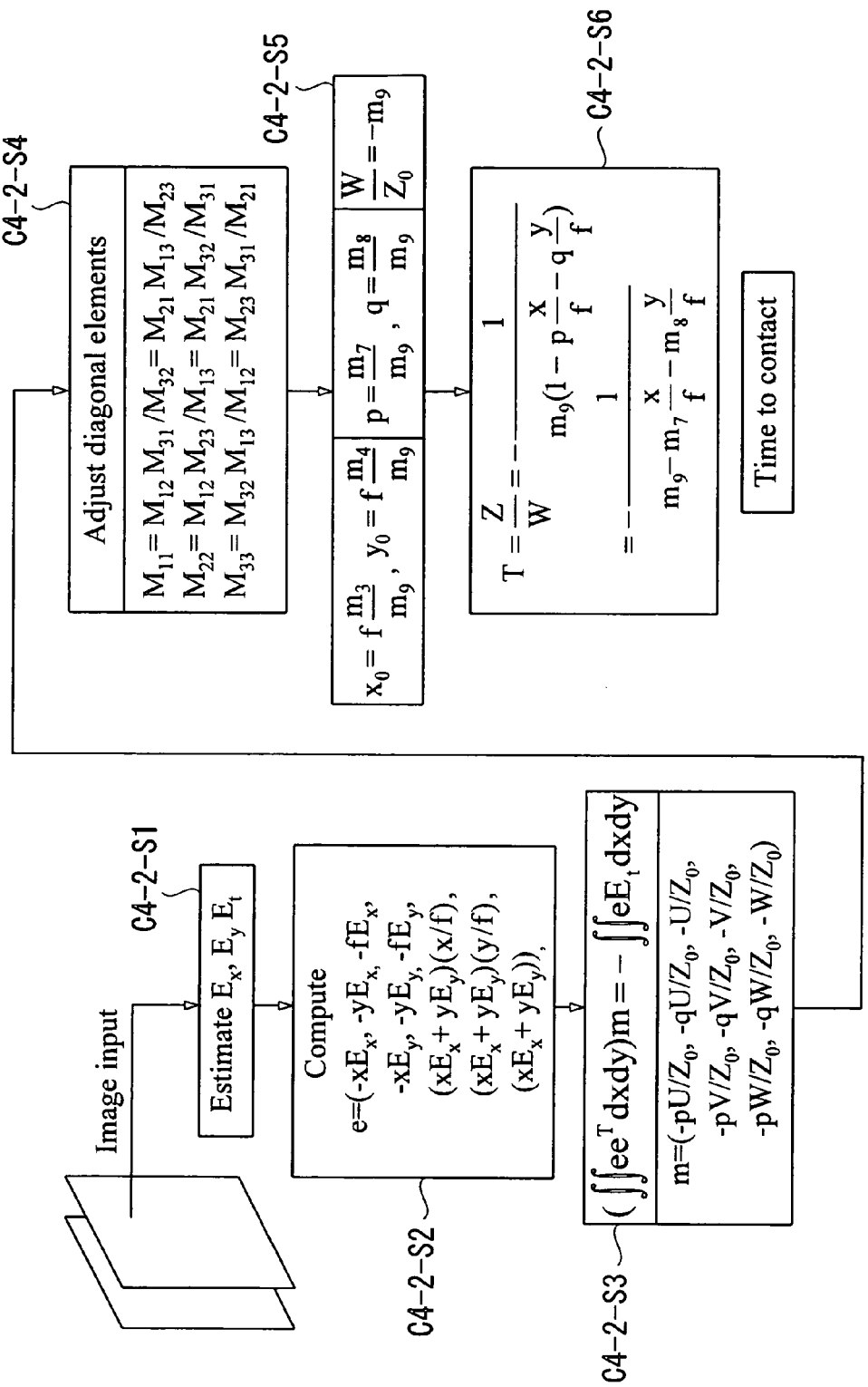
FIG. 15 is a schematic diagram illustrating a calculation flow for the time to contact according to Solution 2 in Case 4.
Figure 16:
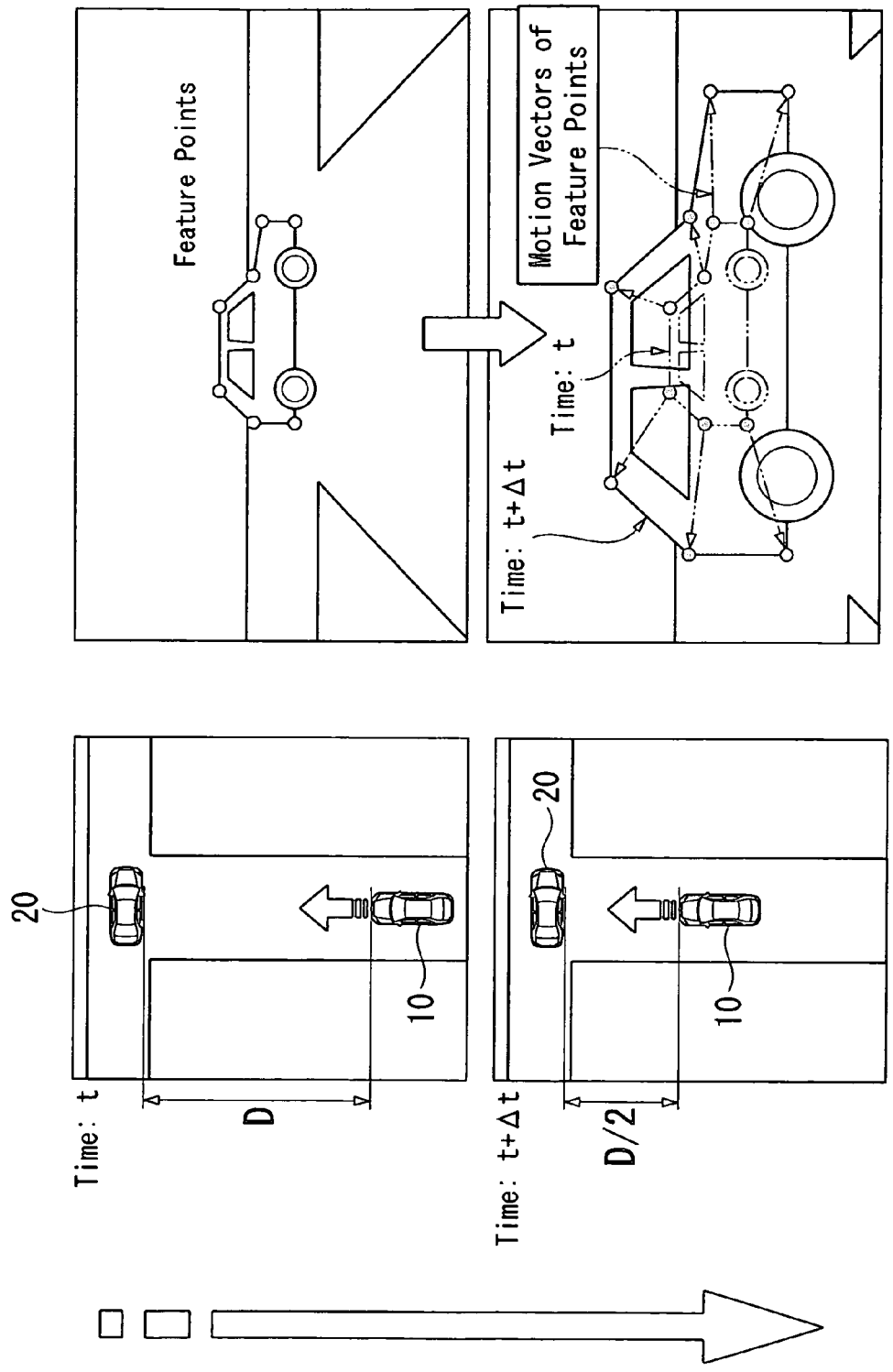
FIG. 16 is a schematic diagram illustrating estimation of the time to contact using a feature tracking method.
Figure 17:
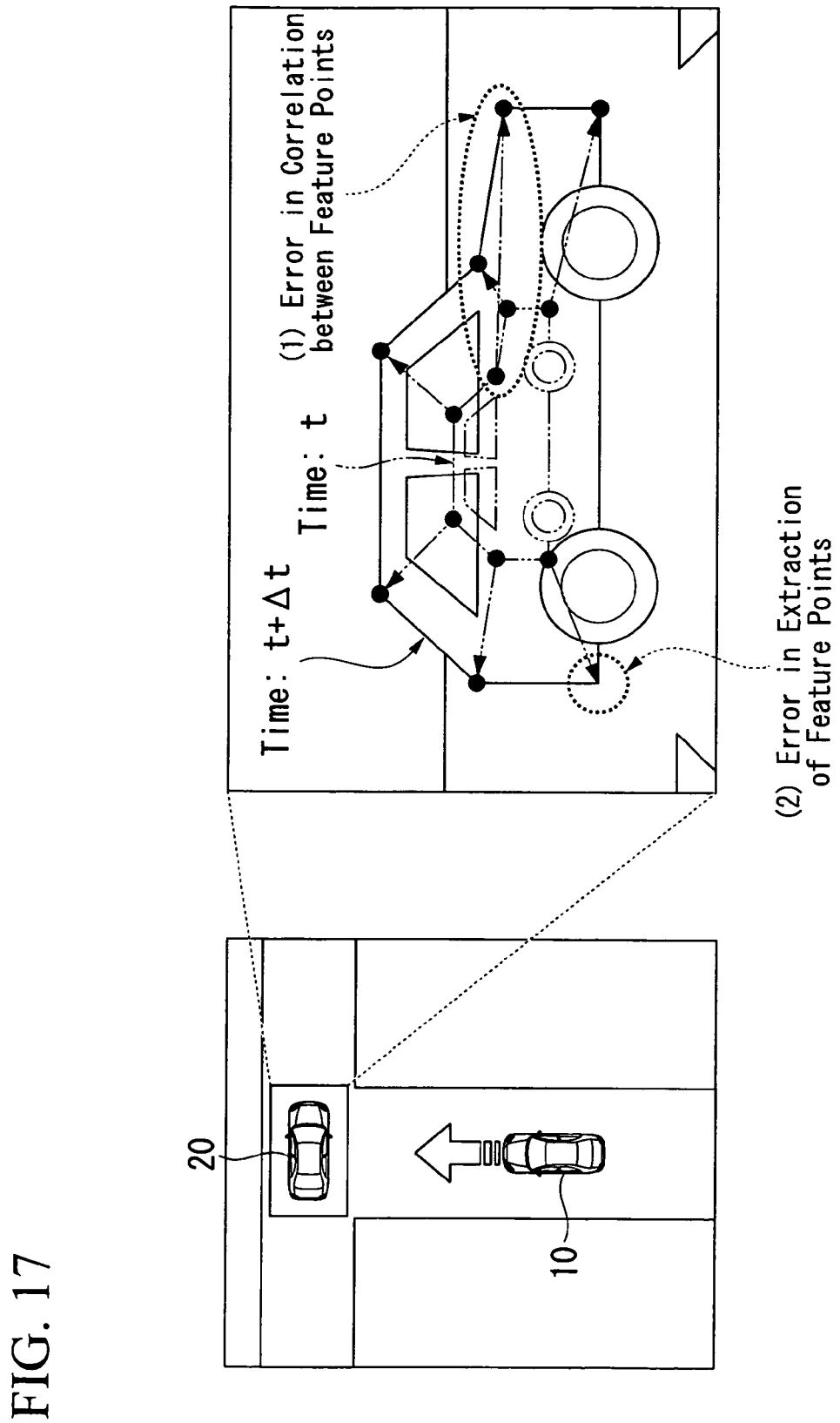
FIG. 17 is a schematic diagram illustrating problems in the feature tracking method.

With reference to FIG. 15, the calculation steps of estimating the TTC in Solution 2 are as follows.
(1) Using two (or more) frames from an image sequence, calculate the derivatives (brightness gradients) $E_x$, $E_y$, and $E_t$ at every pixel in the region of interest from the brightness at the pixel in one image and the brightness at neighboring pixels in that image and the one before it (step C4-2-S1).
(2) Define vector e (step C4-2-S2).
(3) The least-squares method is applied (step C4-2-S3).
(4) Calculate diagonal elements of matrix M (step C4-2-S4).
(5) Calculate each of the elements of vector m (step C4-2-S5).
(6) Estimate the TTC (step C4-2-S6).

The specific embodiments described above are exemplary only and it will be apparent to the person of ordinary skill in the art that numerous alternatives exist as to the exact details of how the time to contact is computed using derivatives of brightness. Furthermore, other combinations of translational and rotational motion and other surface shapes can be treated using this method.

If there are multiple moving objects, the images can be segmented into regions of interest corresponding to images of individual objects.

The time to contact is often considered to be the time until the center of projection of the sensor intersects the surface of the object being viewed. If the sensor is mounted on an extended object of known shape, then the time when that shape first intersects with the object being viewed can be determined.

In the computation of the time to contact it is typically assumed that the motion parameters do not change. If the sensor or the object on which it is mounted has known dynamics and known external disturbances to its motion, then a dynamic model may be created and updated using, for example, a Kalman filter.

The image sensor need not be one for visible light, but could, for example, be a sensor of infrared (IR), ultraviolet (UV) or other electromagnetic radiation.

The imaging system need not be one that takes discrete snap-shots or "frames". It could, for example, have detectors that operate continuously in time, such as photo diodes. Time derivatives can be determined from such continuous signals using electrical circuits known in the art.

The imaging system need not produce an actual image output, but instead may produce only the derivatives of brightness in the image needed in the computation of the time to contact, since the image brightness itself does not enter directly into the computation.

The image sensor need not have picture cells on a rectangular grid, but could, for example, be based on a hexagonal or a triangular grid, or even be continuous in space.

This may be of importance for some image sensors that are only responsive to changes in radiation, not being able to measure the absolute irradiance itself.

The calculation of brightness derivatives and sums of products of derivatives and image coordinates need not be performed digitally, but could instead be done in the analog domain, or in a hybrid fashion. Multiplications, for example, could be accomplished using four-quadrant analog multipliers or instead by using multiplying digitial-to-analog (D/A) converters (McQuirk et al 1998).

The summation of sums of products of derivatives and coordinates could be accomplished in the analog domain also, by, for example, summing currents flowing through a resistor or summing charges deposited into a capacitor (McQuirk et al 1998). Analog and hybrid methods for performing the computation may have advantages in terms of component count or fabrication costs.

What is claimed is:

1. A time-to-contact estimation device for estimating a time to contact of a moving body to an object in surroundings of the moving body, comprising:
   an image sensor provided on the moving body, and continuously capturing time-varying images of the surroundings of the moving body;
   a brightness change calculation unit calculating brightness changes in pixels between the time-varying images captured one after another; and
   a time-to-contact calculation unit calculating optimized brightness gradients based on the brightness changes calculated by the brightness change calculation unit, and calculating the time to contact of the moving body to the object based on the optimized brightness gradients;
   wherein the time-to-contact calculation unit calculates the time to contact of the moving body to the object in different ways by classifying cases depending on whether at least either one of degree of freedom of the object and degree of freedom of the moving body is constrained or none of them is constrained; and
   wherein, when no degrees of freedom of the object and the moving body are constrained, the time-to-contact calculation unit calculates the time to contact of the moving body to the object by executing an iteration process including plural calculations in which either one of an orientation of the object and a translation path of the moving body is assumed to be fixed in each of the calculations.

2. The time-to-contact estimation device according to claim 1, wherein the time-to-contact calculation unit calculates the optimized brightness gradients by obtaining a solution that minimizes a sum of the brightness changes in the pixels of at least a portion of the time-varying images.

3. The time-to-contact estimation device according to claim 1, wherein the time-to-contact calculation unit determines whether at least either one of degree of freedom of the object and degree of freedom of the moving body is constrained or none of them are constrained depending on whether the object is a stationary object or a moving object.

4. The time-to-contact estimation device according to claim 1, wherein the time-to-contact calculation unit calculates the time to contact of the moving body to the object in different ways by classifying cases, depending on an orientation of a planar surface of the object and a translation path along which the moving body approaches the planar surface, into four cases including:
   a first case in which the planar surface is oriented perpendicular to an optical axis of the image sensor and the moving body approaches the planar surface along the optical axis;
   a second case in which the planar surface is oriented perpendicular to the optical axis and the moving body approaches the planar surface in an arbitrary direction;
   a third case in which the planar surface is arbitrarily oriented and the moving body approaches the planar surface along the optical axis; and
   a fourth case in which the planar surface is arbitrarily oriented and the moving body approaches the planar surface in an arbitrary direction.

5. A method for estimating a time to contact of a moving body to an object in surroundings of the moving body, comprising:
   an image capturing step of continuously capturing, from the moving body, time-varying images of the surroundings of the moving body;
   a brightness change calculating step of calculating brightness changes in pixels between the time-varying images captured one after another; and
   a time-to-contact calculating step of calculating optimized brightness gradients based on the brightness changes calculated in the brightness change calculating step, and calculating the time to contact of the moving body to the object based on the optimized brightness gradients;
   wherein, in the time-to-contact calculating step, the time to contact of the moving body to the object is calculated in different ways classifying cases by depending on whether at least either one of degree of freedom of the object and degree of freedom of the moving body is constrained or none of them is constrained; and
   wherein the time-to-contact calculating step includes, when no degrees of freedom of the object and the moving body are constrained, executing an iteration process including plural calculations in which either one of an orientation of the object and a translation path of the moving body is assumed to be fixed in each of the calculations.

6. The method according to claim 5, wherein the time-to-contact calculating step includes, for calculating the optimized brightness gradients, obtaining a solution that minimizes a sum of the brightness changes in the pixels of at least a portion of the time-varying images.

7. The method according to claim 5, wherein, in the time-to-contact calculating step, whether at least either one of degree of freedom of the object and degree of freedom of the moving body is constrained or none of them are constrained is determined depending on whether the object is a stationary object or a moving object.

8. The method according to claim 5, wherein, in the time-to-contact calculating step, the time to contact of the moving body to the object is calculated in different ways by classifying cases, depending on an orientation of a planar surface of the object and a translation path along which the moving body approaches the planar surface, into four cases including:
   a first case in which the planar surface is oriented perpendicular to an optical axis of the image sensor and the moving body approaches the planar surface along the optical axis;
   a second case in which the planar surface is oriented perpendicular to the optical axis and the moving body approaches the planar surface in an arbitrary direction;
   a third case in which the planar surface is arbitrarily oriented and the moving body approaches the planar surface along the optical axis; and
   a fourth case in which the planar surface is arbitrarily oriented and the moving body approaches the planar surface in an arbitrary direction.

* * * * *